(12) United States Patent
Poth, III et al.

(10) Patent No.: US 12,359,569 B2
(45) Date of Patent: Jul. 15, 2025

(54) TURBINE BLADE TIP COOLING HOLE SUPPLY PLENUM

(71) Applicant: Mechanical Dynamics and Analysis LLC, Latham, NY (US)

(72) Inventors: Leissner F. Poth, III, San Antonio, TX (US); Sanjay S. Hingorani, Johns Creek, GA (US); Bensy Samuel, Alpharetta, GA (US)

(73) Assignee: Mechanical Dynamics and Analysis LLC, Latham, NY (US)

( * ) Notice: Subject to any disclaimer, the term of this patent is extended or adjusted under 35 U.S.C. 154(b) by 0 days.

(21) Appl. No.: 18/499,831

(22) Filed: Nov. 1, 2023

(65) Prior Publication Data

US 2024/0060420 A1 Feb. 22, 2024

Related U.S. Application Data

(62) Division of application No. 17/196,523, filed on Mar. 9, 2021, now Pat. No. 11,840,940.

(51) Int. Cl.
*F01D 5/18* (2006.01)

(52) U.S. Cl.
CPC .......... *F01D 5/187* (2013.01); *F05D 2220/32* (2013.01); *F05D 2230/80* (2013.01); *F05D 2240/307* (2013.01); *F05D 2250/74* (2013.01); *F05D 2260/20* (2013.01)

(58) Field of Classification Search
CPC ............... F01D 5/187; F05D 2240/307; F05D 2230/80; F05D 2250/74; F05D 2260/20
See application file for complete search history.

(56) References Cited

U.S. PATENT DOCUMENTS

| | | | | |
|---|---|---|---|---|
| 5,813,836 A * | 9/1998 | Starkweather | .......... | F01D 5/187 416/97 R |
| 6,224,336 B1 * | 5/2001 | Kercher | .................. | F01D 5/186 415/173.1 |
| 6,231,307 B1 * | 5/2001 | Correia | ..................... | F01D 5/20 415/115 |
| 6,991,430 B2 * | 1/2006 | Stec | ......................... | F01D 5/141 415/173.1 |
| 8,016,563 B1 * | 9/2011 | Liang | ....................... | F01D 5/187 416/97 R |
| 9,057,276 B2 * | 6/2015 | Lee | ......................... | F01D 5/147 |
| 11,136,890 B1 * | 10/2021 | Agudo | ...................... | F02C 3/04 |

(Continued)

*Primary Examiner* — Michael K. Reitz
(74) *Attorney, Agent, or Firm* — Burris Law, PLLC

(57) ABSTRACT

A turbine blade includes a root, tip, and airfoil. The turbine blade defines a serpentine interior passage having first through third legs, and first and second junctions. The first leg receives pressurized gas from a supply channel of the root. The first leg extends radially and the first junction connects it to the second leg proximate the tip. The second leg extends radially between the first and second junctions. The second junction connects the second and third legs. The third leg extends radially toward the tip. The tip defines cooling apertures open through a pressure side thereof. The cooling apertures include a forward aperture with a forward end opening into the first junction and an aftward end opening through the pressure side surface of the tip at a location that is radially outward of the third leg and axially aftward of at least a portion of the third leg.

18 Claims, 5 Drawing Sheets

(56) References Cited

U.S. PATENT DOCUMENTS

| | | | |
|---|---|---|---|
| 2013/0156600 A1* | 6/2013 | Bunker | F01D 5/186 416/97 R |
| 2016/0017717 A1* | 1/2016 | Propheter-Hinckley | F01D 5/187 416/95 |
| 2016/0258299 A1* | 9/2016 | Moore | F01D 9/02 |
| 2018/0320530 A1* | 11/2018 | Feldmann | F01D 5/20 |
| 2019/0153873 A1* | 5/2019 | Smith | F04D 29/582 |

* cited by examiner

TURBINE BLADE TIP COOLING HOLE SUPPLY PLENUM

CROSS-REFERENCE TO RELATED APPLICATIONS

This application is a divisional of U.S. application Ser. No. 17/196,523, filed Mar. 9, 2021. The disclosure of the above application is incorporated herein by reference.

FIELD

The present disclosure relates to cooling in turbomachinery and more specifically to cooling of blade tips.

BACKGROUND

The statements in this section merely provide background information related to the present disclosure and may not constitute prior art.

Turbine components (e.g., blades or vanes) operate in high-temperature environments. Providing adequate cooling of the turbine components can be important to increasing component lifespan. Cooling of the turbine component may be provided by the use of compressed air that flows through various passages within, and exiting, the turbine component (e.g., a turbine blade).

One area that has been found to be sensitive to thermal induced degradation and oxidation is the tip of the turbine blade. It has been found that providing cooling air flow to the turbine blade tip can improve the operational durability of the turbine blade. However, existing configurations for cooling the turbine blade tip can suffer from inadequate cooling, particularly in areas of the turbine blade tip near the trailing edge and, in some applications, back flow of hot combustion gas into the turbine blade due to inadequate feed pressure can occur in such areas.

The present disclosure addresses these and other issues associated with cooling of turbine components.

SUMMARY

This section provides a general summary of the disclosure and is not a comprehensive disclosure of its full scope or all of its features.

In one form the present disclosure provides a turbine blade includes a root, a blade tip, and an airfoil. The root defines a plurality of supply channels configured to receive a supply of pressurized gas. The blade tip defines a plurality of tip cooling apertures open through a pressure side surface of the blade tip. The airfoil extends in a radially outward direction from the root to the blade tip. The airfoil has a pressure side surface and a suction side surface connected to the pressure side surface of the airfoil by a leading edge of the airfoil and a trailing edge of the airfoil. The turbine blade defines a first serpentine interior cooling passage having a first leg, a second leg, a third leg, a first junction portion, and a second junction portion. The first leg is configured to receive pressurized gas from at least one supply channel of the plurality of supply channels. The first leg extends radially within the airfoil and is connected to the second leg by the first junction portion proximate the blade tip. The second leg extends radially between the first junction portion and the second junction portion. The second junction portion connects the second leg to the third leg. The third leg extends radially from the second junction portion toward the blade tip. The plurality of tip cooling apertures includes a forward tip cooling aperture that has a forward end that opens into the first junction portion and an aftward end that opens through the pressure side surface of the blade tip at a location that is radially outward of the third leg and axially aftward of at least a portion of the third leg.

According to a variety of alternative optional forms of the turbine blade of the above paragraph that may be implemented individually or in any combination thereof: the first junction portion includes a plenum that overlaps the third leg in an axial direction of the turbine blade, wherein the forward end of the forward tip cooling aperture opens into the plenum; the aftward end of the forward tip cooling aperture exits the blade tip at a location that is aftward of the plenum; the plurality of tip cooling apertures includes an aftmost tip cooling aperture that opens into the third leg; the plurality of tip cooling apertures includes more than eight tip cooling apertures arranged in a row with each tip cooling aperture spaced apart along an axial direction of the turbine blade, wherein, relative to the trailing edge, a first eight tip cooling apertures of the row includes the forward tip cooling aperture; including the forward tip cooling aperture, four of the first eight tip cooling apertures are connected to the first junction portion and four of the first eight tip cooling apertures are connected to the third leg; the turbine blade further defines a second serpentine interior cooling passage configured to receive pressurized gas from at least one supply channel of the plurality of supply channels, the second serpentine interior cooling passage being disposed between the leading edge and the first serpentine interior cooling passage; the trailing edge of the airfoil defines a trailing edge cooling aperture open through the trailing edge and open into the third leg; the airfoil comprises a nominal airfoil profile substantially in accordance with Cartesian coordinate values of X, Y, and Z as set forth in Table I, wherein the values of X and Y are distances in inches which, when connected by smooth continuing arcs, define airfoil profile sections at each value of Z which is a distance expressed as a percentage of a span of the nominal airfoil profile, the airfoil profile sections at the Z distances being joined smoothly with one another to form a complete airfoil shape.

In another form, the present disclosure provides a turbine blade including a root, a blade tip, and an airfoil. The root defines a plurality of supply channels configured to receive a supply of pressurized gas. The blade tip defines a plurality of tip cooling apertures open through a pressure side surface of the blade tip. The airfoil extends in a radially outward direction from the root to the blade tip. The airfoil has a pressure side surface and a suction side surface connected to the pressure side surface of the airfoil by a leading edge of the airfoil and a trailing edge of the airfoil. The turbine blade defines a first serpentine interior cooling passage having a first leg, a second leg, a third leg, a first junction portion, and a second junction portion. The first leg is configured to receive pressurized gas from at least one supply channel of the plurality of supply channels. The first leg extends radially within the airfoil and is connected to the second leg by the first junction portion proximate the blade tip. The second leg extends radially between the first junction portion and the second junction portion. The second junction portion connects the second leg to the third leg. The third leg extends radially from the second junction portion toward the blade tip. The first junction portion includes a plenum that extends axially aftward of a portion of the third leg. The plurality of tip cooling apertures includes a forward tip cooling aperture that has a forward end open to the plenum and an aftward end that opens through the pressure side surface of the blade tip at a location that is radially outward of the third leg and axially aftward of the portion of the third leg.

According to a variety of alternative optional forms of the turbine blade of the above paragraph that may be implemented individually or in any combination thereof: the plurality of tip cooling apertures includes more than eight tip cooling apertures arranged in a row with each tip cooling aperture spaced apart along an axial direction of the turbine blade, wherein, relative to the trailing edge, a first eight tip cooling apertures of the row includes the forward tip cooling aperture; including the forward tip cooling aperture, four of the first eight tip cooling apertures are connected to the first junction portion and four of the first eight tip cooling apertures are connected to the third leg; the plenum does not extend in an axial direction of the turbine blade forward of the first leg; the plurality of tip cooling apertures includes an aftmost tip cooling aperture that opens into the third leg; the location is aftward of the plenum; the turbine blade further defines a second serpentine interior cooling passage configured to receive pressurized gas from at least one supply channel of the plurality of supply channels, the second serpentine interior cooling passage being disposed between the leading edge and the first serpentine interior cooling passage; the airfoil comprises a nominal airfoil profile substantially in accordance with Cartesian coordinate values of X, Y, and Z as set forth in Table I, wherein the values of X and Y are distances in inches which, when connected by smooth continuing arcs, define airfoil profile sections at each value of Z which is a distance expressed as a percentage of a span of the nominal airfoil profile, the airfoil profile sections at the Z distances being joined smoothly with one another to form a complete airfoil shape.

In yet another form, the present disclosure provides a turbine blade including a root, a blade tip, and an airfoil. The root defines a plurality of supply channels configured to receive a supply of pressurized gas. The blade tip defines a plurality of tip cooling apertures open through a pressure side surface of the blade tip. The airfoil extends in a radially outward direction from the root to the blade tip. The airfoil has a pressure side surface and a suction side surface connected to the pressure side surface of the airfoil by a leading edge of the airfoil and a trailing edge of the airfoil, the trailing edge of the airfoil defining a trailing edge cooling aperture. The turbine blade defines a first serpentine interior cooling passage having a first leg, a second leg, a third leg, a first junction portion, and a second junction portion. The first leg is configured to receive pressurized gas from at least one supply channel of the plurality of supply channels. The first leg extends radially within the airfoil and is connected to the second leg by the first junction portion proximate the blade tip. The second leg extends radially between the first junction portion and the second junction portion. The second junction portion connects the second leg to the third leg. The third leg extends radially from the second junction portion toward the blade tip and is connected to the trailing edge cooling aperture to exhaust the pressurized gas to an exterior of the turbine blade. The turbine blade defines a second serpentine interior cooling passage configured to receive pressurized gas from at least one supply channel of the plurality of supply channels. The second serpentine interior cooling passage is disposed between the leading edge and the first serpentine interior cooling passage. The first junction portion includes a plenum that extends axially aftward of a portion of the third leg. The plurality of tip cooling apertures includes a forward tip cooling aperture that has a forward end open to the plenum and an aftward end that opens through the pressure side surface of the blade tip at a location that is radially outward of the third leg and axially aftward of the portion of the third leg. The plurality of tip cooling apertures includes more than eight tip cooling apertures arranged in a row with each tip cooling aperture spaced apart along an axial direction of the turbine blade. Relative to the trailing edge, a first eight tip cooling apertures of the row includes the forward tip cooling aperture. Including the forward tip cooling aperture, four of the first eight tip cooling apertures are connected to the first junction portion and four of the first eight tip cooling apertures are connected to the third leg.

According to a variety of alternative optional forms of the turbine blade of the above paragraph that may be implemented individually or in any combination thereof: the plenum does not extend in an axial direction of the turbine blade forward of the first leg; the location is aftward of the plenum.

In one form according to the teachings of the present disclosure, a turbine blade includes a root, a blade tip, and an airfoil. The root defines a plurality of supply channels configured to receive a supply of pressurized gas. The blade tip defines a plurality of tip cooling apertures through a pressure side surface of the blade tip. The airfoil extends in a radially outward direction from the root to the blade tip. The airfoil has a pressure side surface and a suction side surface connected to the pressure side surface of the airfoil by a leading edge of the airfoil and a trailing edge of the airfoil. The trailing edge of the airfoil defines a trailing edge cooling aperture. The turbine blade defines a first serpentine interior cooling passage having a first leg, a second leg, a third leg, a first junction portion, and a second junction portion. The first leg is configured to receive pressurized gas from at least one supply channel of the plurality of supply channels. The first leg extends radially within the airfoil and is connected to the second leg by the first junction portion proximate the blade tip. The second leg extends radially between the first junction portion and the second junction portion. The second junction portion connects the second leg to the third leg. The third leg extends radially from the second junction portion toward the blade tip and is connected to the trailing edge cooling aperture to exhaust the pressurized gas to an exterior of the turbine blade. The turbine blade defines a plenum connected to the first junction portion. At least one tip cooling aperture of the plurality of tip cooling apertures connects to the plenum. The at least one tip cooling aperture is radially outward of the third leg and axially aftward of at least a portion of the third leg.

According to a variety of alternative optional forms: the plenum extends in an axial direction aftward of the first junction portion and overlaps the third leg in the axial direction; an aftmost tip cooling aperture of the plurality of tip cooling apertures connects to the third leg; the plurality of tip cooling apertures includes more than eight apertures arranged in a row with each tip cooling aperture spaced apart along an axial direction, wherein, relative to the trailing edge, a first eight tip cooling apertures of the row includes at least one cooling aperture connected to the plenum; four of the first eight tip cooling apertures are connected to the plenum and four of the first eight tip cooling apertures are connected to the third leg; the at least one tip cooling aperture exits the blade tip at a location that is aftward of the plenum; the turbine blade further defines a second serpentine interior cooling passage configured to receive pressurized gas from at least one supply channel of the plurality of supply channels, the second serpentine interior cooling passage being disposed between the leading edge and the first serpentine interior cooling passage; the airfoil comprises a nominal airfoil profile substantially in accordance with Cartesian coordinate values of X, Y, and Z as set forth in Table I, wherein the values of X and Y are distances in inches which, when connected by smooth continuing arcs, define airfoil profile sections at each value of Z which is a distance expressed as a percentage of a span of the nominal airfoil profile, the airfoil profile sections at the Z distances being joined smoothly with one another to form a complete airfoil shape.

In another form according to the teachings of the present disclosure, a turbine blade includes a root, a blade tip, and an airfoil. The root defines a plurality of supply channels configured to receive a supply of pressurized gas. The blade tip defines a plurality of tip cooling apertures through a pressure side surface of the blade tip. The airfoil extends in a radially outward direction from the root to the blade tip. The airfoil has a pressure side surface and a suction side surface connected to the pressure side surface of the airfoil by a leading edge of the airfoil and a trailing edge of the airfoil. The trailing edge of the airfoil defines a trailing edge cooling aperture. The turbine blade defines a first serpentine interior cooling passage having a first leg, a second leg, a third leg, a first junction portion, and a second junction portion. The first leg is configured to receive pressurized gas from at least one supply channel of the plurality of supply channels. The first leg extends radially within the airfoil and is connected to the second leg by the first junction portion proximate the blade tip. The second leg extends radially between the first junction portion and the second junction portion. The second junction portion connects the second leg to the third leg. The third leg extends radially from the second junction portion toward the blade tip and is connected to the trailing edge cooling aperture to exhaust the pressurized gas to an exterior of the turbine blade. The turbine blade defines a plenum connected to the first junction portion. At least one tip cooling aperture of the plurality of tip cooling apertures connects to the plenum. The at least one tip cooling aperture is radially outward of the third leg and axially aftward of at least a portion of the third leg. The turbine blade further defines a second serpentine interior cooling passage configured to receive pressurized gas from at least one supply channel of the plurality of supply channels. The second serpentine interior cooling passage is disposed between the leading edge and the first serpentine interior cooling passage. The plurality of tip cooling apertures includes more than eight apertures arranged in a row with each tip cooling aperture spaced apart along an axial direction. Relative to the trailing edge, a first eight tip cooling apertures of the row includes at least one cooling aperture connected to the plenum.

According to a variety of alternative optional forms: four of the first eight tip cooling apertures are connected to the plenum and four of the first eight tip cooling apertures are connected to the third leg; the plenum extends in an axial direction aftward of the first junction portion and overlaps the third leg in the axial direction; an aftmost tip cooling aperture of the plurality of tip cooling apertures connects to the third leg; the at least one tip cooling aperture exits the blade tip at a location that is aftward of the plenum; the airfoil comprises a nominal airfoil profile substantially in accordance with Cartesian coordinate values of X, Y, and Z as set forth in Table I, wherein the values of X and Y are distances in inches which, when connected by smooth continuing arcs, define airfoil profile sections at each value of Z which is a distance expressed as a percentage of a span of the nominal airfoil profile, the airfoil profile sections at the Z distances being joined smoothly with one another to form a complete airfoil shape.

In yet another form according to the teachings of the present disclosure, a method of modifying a turbine blade includes providing a turbine blade in an initial form, removing a section of the turbine blade, and attaching a turbine blade replacement section in place of the removed section of the turbine blade to form a modified turbine blade. The turbine blade in the initial form includes a root defining a plurality of supply channels configured to receive a supply of pressurized gas, a blade tip defining a plurality of tip cooling apertures through a pressure side surface of the blade tip, and an airfoil extending in a radially outward direction from the root to the blade tip. The airfoil has a pressure side surface and a suction side surface connected to the pressure side surface of the airfoil by a leading edge of the airfoil and a trailing edge of the airfoil. The trailing edge of the airfoil defines a trailing edge cooling aperture. The turbine blade defines a first serpentine interior cooling passage having a first leg, a second leg, a third leg, a first junction portion, and a second junction portion. The first leg is configured to receive the pressurized gas from at least one supply channel of the plurality of supply channels. The first leg extends radially within the airfoil and is connected to the second leg by the first junction portion proximate the blade tip. The second leg extends radially between the first junction portion and the second junction portion. The second junction portion connects the second leg to the third leg. The third leg extends radially from the second junction portion toward the blade tip and is connected to the trailing edge cooling aperture to exhaust the pressurized gas to an exterior of the turbine blade. The section of the turbine blade that is removed includes at least one tip cooling aperture of the plurality of tip cooling apertures. The at least one tip cooling aperture being disposed at a location along the blade tip that overlaps in an axial direction with the third leg. The turbine blade replacement section defines at least one replacement tip cooling aperture that is disposed radially outward of the third leg and overlaps in the axial direction with the third leg. The turbine blade replacement section is configured to supply a portion of the pressurized gas from the first junction portion to the at least one replacement tip cooling aperture.

According to a variety of alternative optional forms: the turbine blade replacement section defines a plenum, the at least one replacement tip cooling aperture being connected to the plenum, wherein in the modified turbine blade, the plenum is in fluid communication with the first junction portion, radially outward of the third leg, and overlaps in the axial direction with the third leg; section of the turbine blade removed extends from the leading edge to the trailing edge; the section of turbine blade removed includes a portion of the third leg; the at least one replacement tip cooling aperture includes at least one aftward tip cooling aperture that is aftward of the at least one replacement tip cooling aperture, the turbine blade replacement section connecting the at least one aftward tip cooling aperture to the third leg in the modified turbine blade; fewer of the replacement tip cooling apertures of the modified turbine blade connect to the third leg than the tip cooling apertures of the turbine blade in the initial form.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
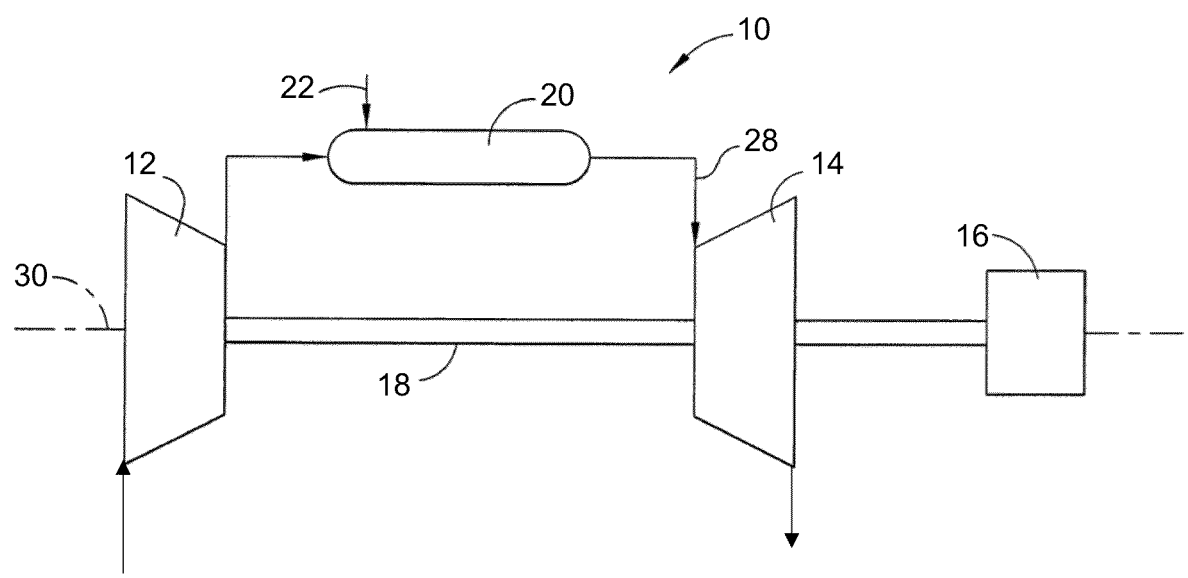
FIG. 1 is schematic view of a gas turbine engine.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an example gas turbine engine 10 is illustrated in schematic form. The gas turbine engine 10 can be any suitable type of turbine engine including, but not limited to, 6FA, 7FA, or 9FA type engines and their variants commercially available (e.g., 7FA.03, 7FA+e, 7FA+ Enhanced, MS7241FA, and PG7241 FA), such as from General Electric Company, Greenville, South Carolina. Generally, the gas turbine engine 10 includes a compressor 12, a turbine 14, and a combustor 20. In the example provided, the gas turbine engine 10 is drivingly coupled to an electric generator 16, though other configurations can be used, such as a gas turbine engine configured for providing thrust (e.g., an aircraft engine) for example.

The compressor 12 and the turbine 14 can be disposed about a common rotational axis 30 and are drivingly coupled together such as by a shaft 18. The shaft 18 may be a single shaft or segmented by a plurality of shaft segments (not specifically shown). While the combustor 20 is shown schematically above the shaft 18 for ease of illustration, the combustor 20 may also be disposed about the axis 30. The compressor 12 supplies compressed air to the combustor 20. Fuel 22 is also supplied to the combustor 20. The compressed air is mixed with the fuel 22 and combustion can take place in the combustor 20. Combustion gasses 28 from the combustor 20 flow through and rotate the turbine 14. The turbine 14 rotates the shaft 18 to rotate the compressor 12 and, in the example provided, to drive the electric generator 16.

While the compressor 12 and turbine 14 are illustrated schematically, it is understood that the turbine 12 can include one or more compressor stages and the turbine 14 can include one or more turbine stages.

Figure 2:
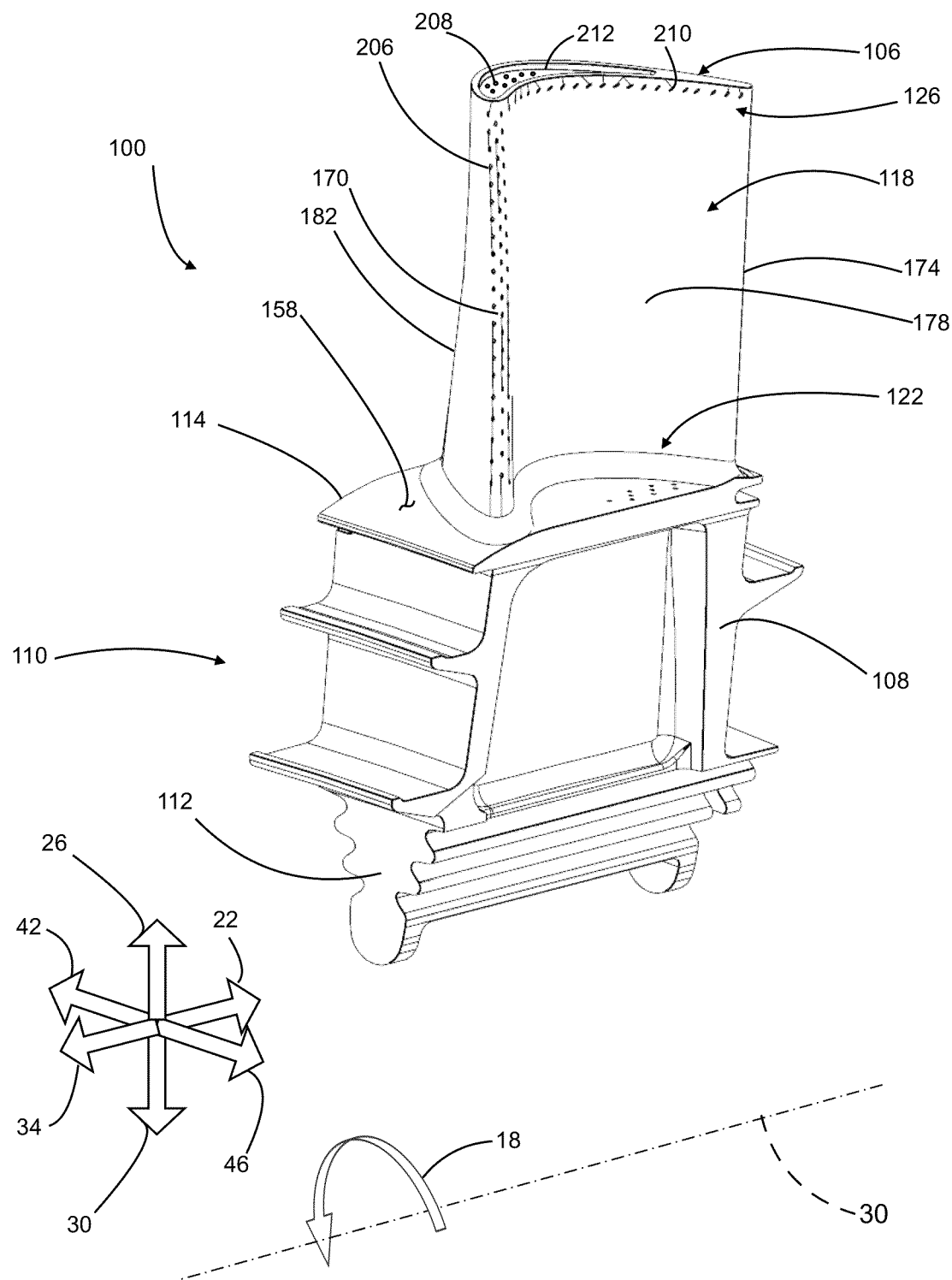
FIG. 2 is a perspective view of a turbine blade in accordance with the teachings of the present disclosure for use in a gas turbine engine such as that shown in FIG. 1.

Referring to FIG. 2, an example turbine component 100 is illustrated. In the example provided, the turbine component 100 is a turbine rotor blade and is also referred to herein as the turbine rotor blade 100 or the turbine blade 100. Although described herein with reference to a blade of a turbine rotor, the turbine component 100 may alternatively be a stator vane.

The turbine blade 100 is configured to be mounted on a rotor (not shown) of the turbine 14 (FIG. 1) of the turbine engine 10 (FIG. 1) such that the turbine blade 100 rotates about the rotational axis 30 in a rotational direction 18 and the main airflow through the turbine 14 (FIG. 1) is generally along direction 22, also referred to herein as the aft direction 22. In FIG. 2, the axis 30 is illustrated for orientation purposes only and the distance from the axis 30 to the turbine blade 100 is not drawn to scale in FIG. 2.

The turbine blade 100 includes a root 110, a platform 114, a blade tip 106, and an airfoil 118. The root 110 includes a shank 108 and a dovetail 112. The shank 108 extends radially inward (e.g., direction 30) from the platform 114 and the dovetail 112 extends radially inward from the shank 108. The dovetail 112 is configured to couple the turbine blade 100 to the rotor (not shown). In the example provided, the dovetail 112 is a shape typically referred to as a fir tree and is configured to be received in a mating channel (not shown) of the rotor (not shown), though other configurations can be used.

The platform 114 is disposed at an interface between the shank 108 and a proximal end portion 122 of the airfoil 118 such that the airfoil 118 extends radially outward (i.e., in direction 26) from the proximal end portion 122 at the platform 114 to a distal end portion 126 at the blade tip 106. The root 110 extends radially inward (i.e., in direction 30) from the platform 114.

The airfoil 118 extends from a top surface 158 of the platform 114 that faces generally radially outward. The airfoil 118 has a leading edge 170, a trailing edge 174, a pressure side surface 178, and a suction side surface 182. The leading edge 170 generally faces in the forward direction 34 and the trailing edge 174 generally faces in the aft direction 22. The suction side surface 182 is a convex curved shape that generally faces in the direction 42 and the pressure side surface 178 is a concave curved shape that generally faces in the direction 46.

The leading edge 170 defines a plurality of leading edge cooling apertures 206 that permit cooling air to exit the airfoil 118 along the leading edge 170, as described in greater detail below. The blade tip 106 defines a plurality of outward tip cooling apertures 208 and a plurality of pressure side tip cooling apertures 210. The outward tip cooling apertures 208 permit cooing air to exit the airfoil 118 in the radially outward direction 26 through the blade tip 106. In the example provided, the outward tip cooling apertures 208 permit the cooling air to exit the airfoil 118 into a recess 212 defined in the radially outward end of the turbine blade 100.

The pressure side tip cooling apertures 210 are arranged to permit cooling air to exit the pressure side surface 178 of the airfoil 118 along a pressure side of the blade tip 106. With additional reference to FIG. 3, the trailing edge 174 also defines at least one trailing edge cooling aperture 204.

In the example provided, the trailing edge cooling aperture 204 is a single, narrow slot that extends lengthwise substantially the entire length (in the radial directions 26, 30) of the trailing edge 174, though other configurations can be used, e.g., a plurality of discrete apertures spaced along the trailing edge 174.

Figure 3:
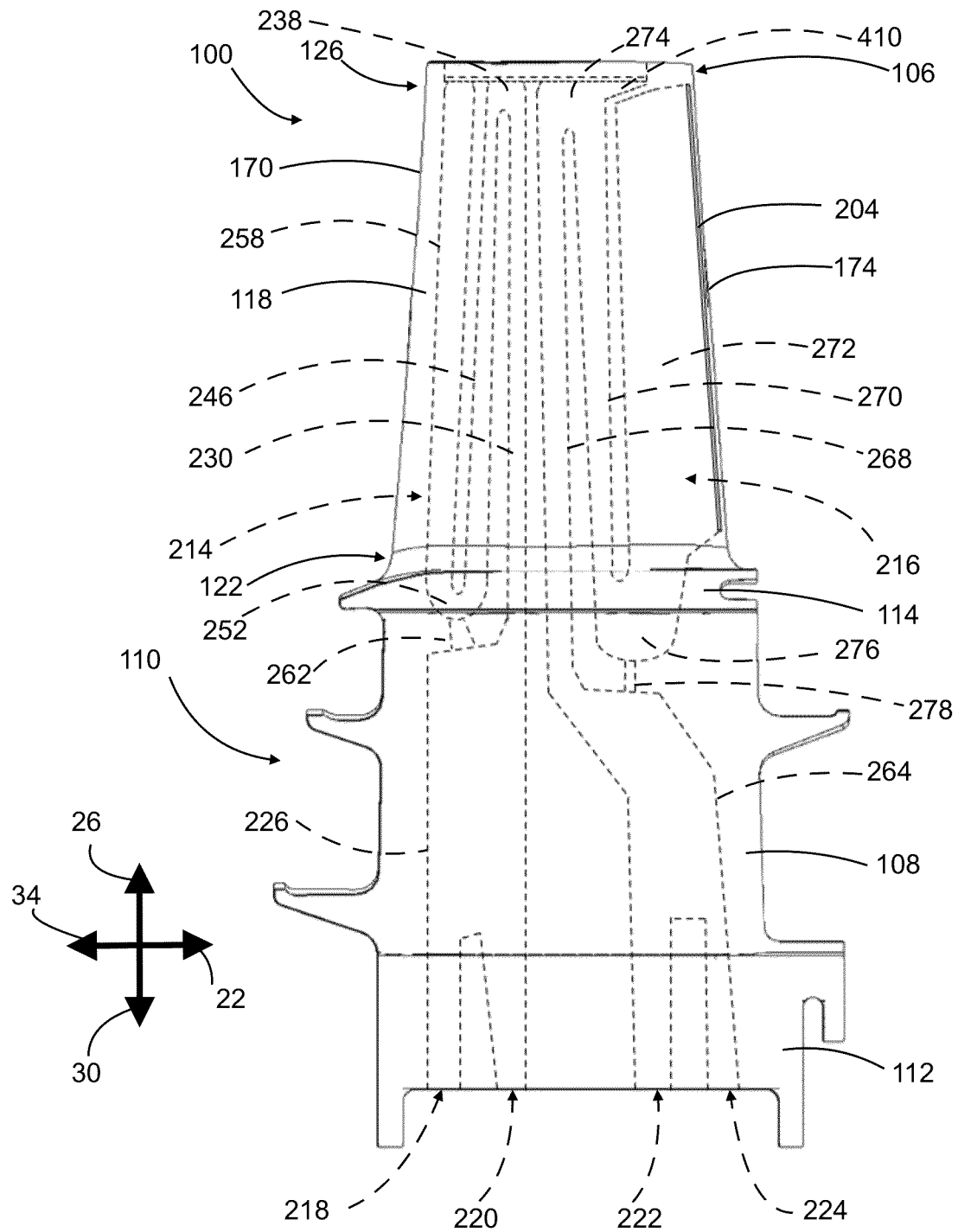
FIG. 3 is a side view of the turbine blade of FIG. 2, illustrating a plurality of airfoil cooling passages within the turbine blade in accordance with the teachings of the present disclosure.

Referring to FIG. 3, the turbine blade 100 defines a plurality of internal cooling passages 214, 216 in fluid communication with the cooling apertures 204, 206, 208, and/or 210 (FIG. 2). The internal cooling passages 214, 216 have inlets 218, 220, 222, 224 located in the dovetail 112 configured to receive pressurized air from the rotor (not shown). While four inlets 218, 220, 222, 224 are illustrated, other numbers of inlets can be used such as one inlet, two inlets, three inlets, or more than four inlets.

In the example provided, the cooling passage 214 includes a plenum chamber 226 in the shank 108 that receives cooling air from the inlets 218 and 220. The plenum chamber 226 provides the air to a leg 230 of the cooling passage 214 that extends radially outward through the platform 114 into the airfoil 118 and extends to the distal end portion 126 of the airfoil 118. At the distal end portion 126 of the airfoil 118, the leg 230 is connected to a junction portion 238 of the cooling passage 214, which can be curved or arcuate. The junction portion 238 directs the pressurized cooling air back radially inward to another leg 246 of the cooling passage 214 that extends radially inward toward the platform 114. In the example provided, some of the outward cooling apertures 208 (FIG. 2) in the blade tip 106 may be open to the junction portion 238.

The leg 246 extends from the distal end portion 126 to the proximal end portion 122. The leg 246 is connected to another junction portion 252 of the cooling passage 214 that is located proximate the platform 114 and can be located fully or partially within the airfoil 118, the platform 114 or the shank 108. The junction portion 252 curves back up so that the pressurized cooling air is directed radially outward into another leg 258 of the cooling passage 214. The leg 258 extends radially outward toward the distal end portion 126. In the example provided, the leg 258 extends fully to the blade tip 106 and is open to the leading edge cooling apertures 206 (FIG. 2) and may also be open to some of the outward cooling apertures 208 (FIG. 2) at the blade tip 106, and may also be open to some of the pressure side cooling apertures 210 (FIG. 2), though other configurations can be used. As such, the legs 230, 246, 258 and junction portions 238, 252 define a cooling passage having a serpentine path through a forward section of the turbine blade 100. In the example provided, an additional passageway 262 can optionally connect directly from the plenum chamber 226 to the arcuate portion 252.

In the example provided, the aft cooling passage 216 similarly includes a second plenum chamber 264 that receives air from the inlets 222, 224 and provides the air to a first leg 268 of the aft cooling passage 216 that extends radially outward through the platform 114 into the airfoil 118 and extends to the distal end portion 126 of the airfoil 118. At the distal end portion 126 of the airfoil 118, the first leg 268 is connected to a first junction portion 274 of the aft cooling passage 216, which can be curved or arcuate. The first junction portion 274 directs the pressurized cooling air back radially inward to a second leg 270 of the cooling passage 216 that extends radially inward toward the platform 114. In the example provided, some of the outward cooling apertures 208 (FIG. 2) in the blade tip 106 may be open to the first junction portion 274.

The second leg 270 extends from the distal end portion 126 to the proximal end portion 122. The second leg 270 is connected to a second junction portion 276 of the cooling passage 216 that is located proximate the platform 114 and can be located fully or partially within the airfoil 118, the platform 114, or the shank 108. The second junction portion 276 curves back up so that the pressurized cooling air is directed radially outward into a third leg 272 of the cooling passage 216. The third leg 272 extends radially outward toward the distal end portion 126. In the example provided, the third leg 272 extends fully to the blade tip 106 and is open to the trailing edge aperture(s) 204 and may be open to some of the outward cooling apertures 208 (FIG. 2) at the blade tip 106, and may also be open to some of the pressure side cooling apertures 210 (FIG. 2), though other configurations can be used. As such, the first, second, and third legs 268, 270, 272 and the first and second junction portions 274, 276 define a cooling passage having a serpentine path through an aft section of the turbine blade 100. In the example provided, an additional passageway 278 can optionally connect directly from the plenum chamber 264 to the arcuate portion 252.

Figure 4:
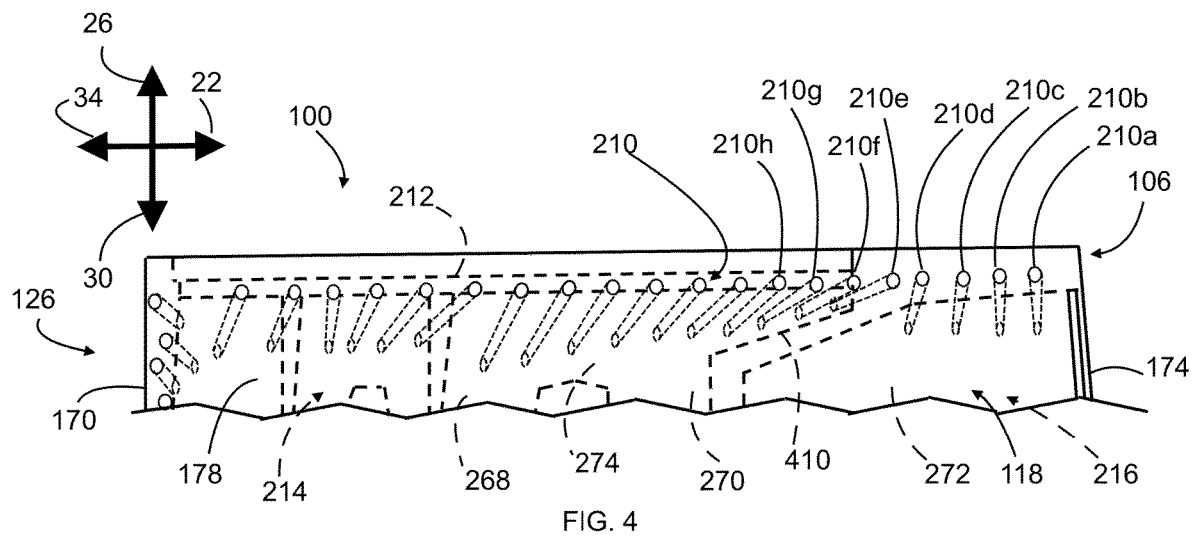
FIG. 4 is a side view of a portion of the turbine blade of FIG. 3, illustrating the airfoil cooling passages and a plurality of blade tip cooling apertures in accordance with the teachings of the present disclosure.

With additional reference to FIG. 4, the distal end portion 126 and blade tip 106 of the turbine blade 100 are illustrated in greater detail. The pressure side cooling apertures 210 are spaced along the blade tip 106 between the leading edge 170 and the trailing edge 174. In FIG. 4 and as used herein, the pressure side cooling apertures are collectively indicated with the reference number 210 and the first eight of the pressure side cooling apertures 210 are individually identified with a suffix letter, e.g., 210a, 210b, 210c, 210d, 210e, 210f, 210g, 210h. The aftmost pressure side cooling apertures 210 (e.g., 210a-210h) overlap in the axial direction 22, 34 with the third leg 272 and, in the example provided, are radially outward of the third leg 272. At least one of these aftmost pressure side cooling apertures 270 is connected to a plenum 410 defined by the turbine blade 100. The plenum 410 is connected directly to or forms a portion of the first junction portion 274. As such pressurized cooling air can flow from the first junction portion 274 through the plenum 410 to at least some of the pressure side cooling apertures 210 that are axially aftward of at least a portion of the third leg 272. In the example provided, all of the pressure side cooling apertures 210 are radially inward of the recess 212, though other configurations can be used.

In the example provided, the turbine blade 100 has more than eight of the pressure side cooling passages 210 and, starting at the trailing edge 174, at least one of the first eight pressure side cooling apertures 210 is connected to the plenum 410 to receive pressurized cooling air therefrom. In the example provided, the first four (i.e., four aftmost) pressure side cooling apertures 210a-210d are connected to the third leg 272 to receive pressurized cooling air therefrom and the next four pressure side cooling apertures 210e-210h are connected to the plenum 410, though other configurations can be used such as more or less of the pressure side cooling apertures 210 being connected to the third leg 272 or plenum 410.

Since the pressure of the pressurized cooling fluid decreases as it flows through the cooling passage 216, these aftward pressure side cooling apertures 210 (e.g., 210e-210h) that are connected to the plenum 410 can receive cooling air at a higher pressure than if similarly located cooling apertures were connected to the third leg 272.

In the example provided, the pressure side cooling apertures 210 are disposed in a single row along the pressure side surface 178 at the blade tip 106, though other configurations can be used.

In the example provided, the plenum 410 extends from the first junction portion 274 in the axial aftward direction 22 to overlap axially a portion of the third leg 272 such that at least part of the plenum 410 can be radially outward of the portion of the third leg 272. In the example provided, the plenum 410 does not overlap the entire third leg 272. In an alternative configuration, not specifically shown, the plenum 410 may overlap more or less of the third leg 272 than shown in the example of FIG. 4, including the entire third leg 272. The plenum 410 may also be connected to one or more of the outward cooling apertures 208 (FIG. 2). In the example provided, the plenum 410 is not directly connected to the third leg 272. One or more of the pressure side cooling apertures 210 that are connected to the plenum 410 may optionally be aftward of the plenum 410.

Returning to FIG. 2, the airfoil 118 may have any suitable airfoil shape. In one configuration, the airfoil 118 has a profile substantially in accordance with Cartesian coordinate values of X, Y, and Z of a pressure side as set forth in Table I. In another configuration, the airfoil 118 has a profile substantially in accordance with Cartesian coordinate values of X, Y, and Z of a suction side as set forth in Table I. In yet another configuration, the airfoil 118 has a profile substantially in accordance with Cartesian coordinate values of X, Y, and Z of a pressure side and a suction side as set forth in Table I.

In Table I, the Cartesian coordinate values of X, Y, and Z are such that Z is expressed as a percentage of the airfoil's span and the X and Y values are the dimensions in inches of the airfoil's nominal shape. In the example provided, the table is based on a nominal airfoil span of 6.308 inches, though other spans can be used. At each Z value, the X and Y coordinates describe the airfoil's cross-section profile shape, with the profile shapes joined by smooth continuous splines to form a complete 3-dimensional airfoil (i.e., airfoil 118). By expressing the Z value as a percentage of span and allowing the X and Y values to be scaled (or multiplied) by any appropriate constant number, an airfoil of any chord length can be used in any flowpath annulus by multiplying the Z values by the airfoil's spanwise height and the X and Y values by the desired chord length.

As such, the airfoil comprises a nominal airfoil profile substantially in accordance with Cartesian coordinate values of X, Y, and Z as set forth in Table I, wherein the values of X and Y are distances in inches which, when connected by smooth continuing arcs, define airfoil profile sections at each value of Z which is a distance expressed as a percentage of a span of the nominal airfoil profile, the airfoil profile sections at the Z distances being joined smoothly with one another to form a complete airfoil shape.

TABLE I

| Sections | Points per Section | A-Dimension (in.) | Span (in.) |
|---|---|---|---|
| 10 | 112 | 40.794998 | 6.308002 |

| SECTION 1 | | Suction Side | | |
|---|---|---|---|---|
| Pt. | X | Y | Z | %-Span |
| 1 | −2.352958 | −0.707216 | −0.324997 | −0.051521 |
| 2 | −2.359088 | −0.703116 | −0.324997 | −0.051521 |

TABLE I-continued

| | | | | |
|---|---|---|---|---|
| 3 | −2.365098 | −0.698846 | −0.324997 | −0.051521 |
| 4 | −2.376738 | −0.689776 | −0.324997 | −0.051521 |
| 5 | −2.387798 | −0.680016 | −0.324997 | −0.051521 |
| 6 | −2.403248 | −0.664176 | −0.324997 | −0.051521 |
| 7 | −2.421508 | −0.641006 | −0.324997 | −0.051521 |
| 8 | −2.440238 | −0.609246 | −0.324997 | −0.051521 |
| 9 | −2.458108 | −0.560806 | −0.324997 | −0.051521 |
| 10 | −2.466418 | −0.494956 | −0.324997 | −0.051521 |
| 11 | −2.461968 | −0.413946 | −0.324997 | −0.051521 |
| 12 | −2.444218 | −0.319716 | −0.324997 | −0.051521 |
| 13 | −2.413138 | −0.213546 | −0.324997 | −0.051521 |
| 14 | −2.369238 | −0.096096 | −0.324997 | −0.051521 |
| 15 | −2.313388 | 0.032424 | −0.324997 | −0.051521 |
| 16 | −2.245578 | 0.171672 | −0.324997 | −0.051521 |
| 17 | −2.163818 | 0.320302 | −0.324997 | −0.051521 |
| 18 | −2.064448 | 0.475622 | −0.324997 | −0.051521 |
| 19 | −1.951228 | 0.630392 | −0.324997 | −0.051521 |
| 20 | −1.817718 | 0.787952 | −0.324997 | −0.051521 |
| 21 | −1.664338 | 0.93702 | −0.324997 | −0.051521 |
| 22 | −1.496738 | 1.0699 | −0.324997 | −0.051521 |
| 23 | −1.309058 | 1.18709 | −0.324997 | −0.051521 |
| 24 | −1.108528 | 1.28061 | −0.324997 | −0.051521 |
| 25 | −0.897948 | 1.34851 | −0.324997 | −0.051521 |
| 26 | −0.679088 | 1.381068 | −0.324997 | −0.051521 |
| 27 | −0.458088 | 1.370448 | −0.324997 | −0.051521 |
| 28 | −0.24107 | 1.327298 | −0.324997 | −0.051521 |
| 29 | −0.03813 | 1.239138 | −0.324997 | −0.051521 |
| 30 | 0.14515 | 1.115168 | −0.324997 | −0.051521 |
| 31 | 0.31105 | 0.968768 | −0.324997 | −0.051521 |
| 32 | 0.4617 | 0.806708 | −0.324997 | −0.051521 |
| 33 | 0.59958 | 0.633658 | −0.324997 | −0.051521 |
| 34 | 0.728548 | 0.453868 | −0.324997 | −0.051521 |
| 35 | 0.849908 | 0.268858 | −0.324997 | −0.051521 |
| 36 | 0.965488 | 0.080188 | −0.324997 | −0.051521 |
| 37 | 1.070128 | −0.106352 | −0.324997 | −0.051521 |
| 38 | 1.165808 | −0.297652 | −0.324997 | −0.051521 |
| 39 | 1.251688 | −0.485462 | −0.324997 | −0.051521 |
| 40 | 1.326548 | −0.662002 | −0.324997 | −0.051521 |
| 41 | 1.396998 | −0.8324 | −0.324997 | −0.051521 |
| 42 | 1.459998 | −0.9899 | −0.324997 | −0.051521 |
| 43 | 1.516258 | −1.13421 | −0.324997 | −0.051521 |
| 44 | 1.563818 | −1.26602 | −0.324997 | −0.051521 |
| 45 | 1.604538 | −1.38461 | −0.324997 | −0.051521 |
| 46 | 1.640498 | −1.48923 | −0.324997 | −0.051521 |
| 47 | 1.671198 | −1.58007 | −0.324997 | −0.051521 |
| 48 | 1.696178 | −1.65725 | −0.324997 | −0.051521 |
| 49 | 1.716968 | −1.72029 | −0.324997 | −0.051521 |
| 50 | 1.730228 | −1.77019 | −0.324997 | −0.051521 |
| 51 | 1.732218 | −1.80701 | −0.324997 | −0.051521 |
| 52 | 1.725418 | −1.83572 | −0.324997 | −0.051521 |
| 53 | 1.713728 | −1.8545 | −0.324997 | −0.051521 |
| 54 | 1.703438 | −1.86507 | −0.324997 | −0.051521 |
| 55 | 1.691658 | −1.87394 | −0.324997 | −0.051521 |
| 56 | 1.685268 | −1.87763 | −0.324997 | −0.051521 |

| SECTION 1 | | Pressure Side | | |
|---|---|---|---|---|
| Pt. | X | Y | Z | %-Span |
| 57 | 1.678609 | −1.88081 | −0.324997 | −0.051521 |
| 58 | 1.673869 | −1.88279 | −0.324997 | −0.051521 |
| 59 | 1.66902 | −1.88449 | −0.324997 | −0.051521 |
| 60 | 1.659019 | −1.88692 | −0.324997 | −0.051521 |
| 61 | 1.64878 | −1.88784 | −0.324997 | −0.051521 |
| 62 | 1.63336 | −1.8876 | −0.324997 | −0.051521 |
| 63 | 1.613129 | −1.88392 | −0.324997 | −0.051521 |
| 64 | 1.589849 | −1.87301 | −0.324997 | −0.051521 |
| 65 | 1.56197 | −1.85025 | −0.324997 | −0.051521 |
| 66 | 1.53364 | −1.81366 | −0.324997 | −0.051521 |
| 67 | 1.503489 | −1.76582 | −0.324997 | −0.051521 |
| 68 | 1.46842 | −1.70892 | −0.324997 | −0.051521 |
| 69 | 1.42853 | −1.64292 | −0.324997 | −0.051521 |
| 70 | 1.3846 | −1.56735 | −0.324997 | −0.051521 |
| 71 | 1.335379 | −1.48297 | −0.324997 | −0.051521 |
| 72 | 1.27914 | −1.39081 | −0.324997 | −0.051521 |
| 73 | 1.21543 | −1.29119 | −0.324997 | −0.051521 |
| 74 | 1.1445 | −1.18399 | −0.324997 | −0.051521 |
| 75 | 1.06877 | −1.07384 | −0.324997 | −0.051521 |
| 76 | 0.98391 | −0.957552 | −0.324997 | −0.051521 |
| 77 | 0.89241 | −0.839832 | −0.324997 | −0.051521 |

TABLE I-continued

| Pt. | X | Y | Z | %-Span |
|---|---|---|---|---|
| 78 | 0.79729 | −0.725012 | −0.324997 | −0.051521 |
| 79 | 0.69403 | −0.610432 | −0.324997 | −0.051521 |
| 80 | 0.58567 | −0.500672 | −0.324997 | −0.051521 |
| 81 | 0.4722 | −0.396192 | −0.324997 | −0.051521 |
| 82 | 0.35288 | −0.298452 | −0.324997 | −0.051521 |
| 83 | 0.22735 | −0.208822 | −0.324997 | −0.051521 |
| 84 | 0.09514 | −0.12939 | −0.324997 | −0.051521 |
| 85 | −0.04307 | −0.06091 | −0.324997 | −0.051521 |
| 86 | −0.18614 | −0.00327 | −0.324997 | −0.051521 |
| 87 | −0.334378 | 0.03933 | −0.324997 | −0.051521 |
| 88 | −0.486888 | 0.06235 | −0.324997 | −0.051521 |
| 89 | −0.641118 | 0.0645 | −0.324997 | −0.051521 |
| 90 | −0.794348 | 0.046902 | −0.324997 | −0.051521 |
| 91 | −0.945098 | 0.014262 | −0.324997 | −0.051521 |
| 92 | −1.092138 | −0.032318 | −0.324997 | −0.051521 |
| 93 | −1.230308 | −0.088338 | −0.324997 | −0.051521 |
| 94 | −1.363608 | −0.155146 | −0.324997 | −0.051521 |
| 95 | −1.486648 | −0.229886 | −0.324997 | −0.051521 |
| 96 | −1.597378 | −0.304776 | −0.324997 | −0.051521 |
| 97 | −1.701638 | −0.379946 | −0.324997 | −0.051521 |
| 98 | −1.794258 | −0.453466 | −0.324997 | −0.051521 |
| 99 | −1.875888 | −0.524126 | −0.324997 | −0.051521 |
| 100 | −1.948998 | −0.588916 | −0.324997 | −0.051521 |
| 101 | −2.01421 | −0.647116 | −0.324997 | −0.051521 |
| 102 | −2.07251 | −0.697606 | −0.324997 | −0.051521 |
| 103 | −2.130908 | −0.730096 | −0.324997 | −0.051521 |
| 104 | −2.185698 | −0.744116 | −0.324997 | −0.051521 |
| 105 | −2.231928 | −0.746146 | −0.324997 | −0.051521 |
| 106 | −2.267648 | −0.741716 | −0.324997 | −0.051521 |
| 107 | −2.292568 | −0.735406 | −0.324997 | −0.051521 |
| 108 | −2.311938 | −0.728496 | −0.324997 | −0.051521 |
| 109 | −2.326038 | −0.722246 | −0.324997 | −0.051521 |
| 110 | −2.335208 | −0.717606 | −0.324997 | −0.051521 |
| 111 | −2.344188 | −0.712586 | −0.324997 | −0.051521 |
| 112 | −2.348598 | −0.709936 | −0.324997 | −0.051521 |

| SECTION 2 | | Suction Side | | |
|---|---|---|---|---|
| Pt. | X | Y | Z | %-Span |
| 1 | −2.33291 | −0.64703 | 0.026001 | 0.004122 |
| 2 | −2.33895 | −0.64303 | 0.026001 | 0.004122 |
| 3 | −2.34486 | −0.63885 | 0.026001 | 0.004122 |
| 4 | −2.35628 | −0.62994 | 0.026001 | 0.004122 |
| 5 | −2.36711 | −0.62033 | 0.026001 | 0.004122 |
| 6 | −2.38217 | −0.60468 | 0.026001 | 0.004122 |
| 7 | −2.39983 | −0.58172 | 0.026001 | 0.004122 |
| 8 | −2.41765 | −0.55021 | 0.026001 | 0.004122 |
| 9 | −2.43371 | −0.50214 | 0.026001 | 0.004122 |
| 10 | −2.44171 | −0.43747 | 0.026001 | 0.004122 |
| 11 | −2.43883 | −0.35788 | 0.026001 | 0.004122 |
| 12 | −2.42297 | −0.2651 | 0.026001 | 0.004122 |
| 13 | −2.39317 | −0.16066 | 0.026001 | 0.004122 |
| 14 | −2.34956 | −0.04556 | 0.026001 | 0.004122 |
| 15 | −2.29278 | 0.07974 | 0.026001 | 0.004122 |
| 16 | −2.22318 | 0.21492 | 0.026001 | 0.004122 |
| 17 | −2.13952 | 0.35892 | 0.026001 | 0.004122 |
| 18 | −2.03871 | 0.50926 | 0.026001 | 0.004122 |
| 19 | −1.92403 | 0.65854 | 0.026001 | 0.004122 |
| 20 | −1.78919 | 0.80993 | 0.026001 | 0.004122 |
| 21 | −1.63515 | 0.95262 | 0.026001 | 0.004122 |
| 22 | −1.46727 | 1.07873 | 0.026001 | 0.004122 |
| 23 | −1.28004 | 1.18885 | 0.026001 | 0.004122 |
| 24 | −1.08063 | 1.27497 | 0.026001 | 0.004122 |
| 25 | −0.87167 | 1.33426 | 0.026001 | 0.004122 |
| 26 | −0.65582 | 1.35849 | 0.026001 | 0.004122 |
| 27 | −0.43933 | 1.34071 | 0.026001 | 0.004122 |
| 28 | −0.22849 | 1.2885 | 0.026001 | 0.004122 |
| 29 | −0.03224 | 1.1954 | 0.026001 | 0.004122 |
| 30 | 0.14479 | 1.06955 | 0.026001 | 0.004122 |
| 31 | 0.30499 | 0.92285 | 0.026001 | 0.004122 |
| 32 | 0.45081 | 0.76186 | 0.026001 | 0.004122 |
| 33 | 0.58514 | 0.59117 | 0.026001 | 0.004122 |
| 34 | 0.71112 | 0.41422 | 0.026001 | 0.004122 |
| 35 | 0.82994 | 0.23239 | 0.026001 | 0.004122 |
| 36 | 0.94297 | 0.0469 | 0.026001 | 0.004122 |
| 37 | 1.04554 | −0.13631 | 0.026001 | 0.004122 |
| 38 | 1.14059 | −0.32353 | 0.026001 | 0.004122 |
| 39 | 1.22624 | −0.50728 | 0.026001 | 0.004122 |
| 40 | 1.3012 | −0.67997 | 0.026001 | 0.004122 |
| 41 | 1.37079 | −0.84707 | 0.026001 | 0.004122 |
| 42 | 1.43296 | −1.00156 | 0.026001 | 0.004122 |
| 43 | 1.4884 | −1.14313 | 0.026001 | 0.004122 |
| 44 | 1.53615 | −1.27215 | 0.026001 | 0.004122 |
| 45 | 1.57737 | −1.38813 | 0.026001 | 0.004122 |
| 46 | 1.61344 | −1.49057 | 0.026001 | 0.004122 |
| 47 | 1.64439 | −1.57946 | 0.026001 | 0.004122 |
| 48 | 1.66958 | −1.65502 | 0.026001 | 0.004122 |
| 49 | 1.69047 | −1.71674 | 0.026001 | 0.004122 |
| 50 | 1.70427 | −1.76551 | 0.026001 | 0.004122 |
| 51 | 1.7075 | −1.80157 | 0.026001 | 0.004122 |
| 52 | 1.70253 | −1.8301 | 0.026001 | 0.004122 |
| 53 | 1.69282 | −1.84953 | 0.026001 | 0.004122 |
| 54 | 1.68358 | −1.86068 | 0.026001 | 0.004122 |
| 55 | 1.67276 | −1.8703 | 0.026001 | 0.004122 |
| 56 | 1.66681 | −1.87443 | 0.026001 | 0.004122 |

| SECTION 2 | | Pressure Side | | |
|---|---|---|---|---|
| Pt. | X | Y | Z | %-Span |
| 57 | 1.66056 | −1.87808 | 0.026001 | 0.004122 |
| 58 | 1.65601 | −1.88034 | 0.026001 | 0.004122 |
| 59 | 1.65133 | −1.88235 | 0.026001 | 0.004122 |
| 60 | 1.64169 | −1.88558 | 0.026001 | 0.004122 |
| 61 | 1.63175 | −1.88773 | 0.026001 | 0.004122 |
| 62 | 1.61653 | −1.88884 | 0.026001 | 0.004122 |
| 63 | 1.59633 | −1.88644 | 0.026001 | 0.004122 |
| 64 | 1.57254 | −1.87748 | 0.026001 | 0.004122 |
| 65 | 1.54485 | −1.8551 | 0.026001 | 0.004122 |
| 66 | 1.51721 | −1.81862 | 0.026001 | 0.004122 |
| 67 | 1.4873 | −1.77134 | 0.026001 | 0.004122 |
| 68 | 1.45261 | −1.71507 | 0.026001 | 0.004122 |
| 69 | 1.41349 | −1.64958 | 0.026001 | 0.004122 |
| 70 | 1.36964 | −1.57507 | 0.026001 | 0.004122 |
| 71 | 1.32031 | −1.49199 | 0.026001 | 0.004122 |
| 72 | 1.26437 | −1.40102 | 0.026001 | 0.004122 |
| 73 | 1.20129 | −1.30252 | 0.026001 | 0.004122 |
| 74 | 1.13092 | −1.19663 | 0.026001 | 0.004122 |
| 75 | 1.05568 | −1.0879 | 0.026001 | 0.004122 |
| 76 | 0.97156 | −0.97301 | 0.026001 | 0.004122 |
| 77 | 0.88089 | −0.8567 | 0.026001 | 0.004122 |
| 78 | 0.78663 | −0.74327 | 0.026001 | 0.004122 |
| 79 | 0.68484 | −0.62963 | 0.026001 | 0.004122 |
| 80 | 0.5786 | −0.52014 | 0.026001 | 0.004122 |
| 81 | 0.46761 | −0.41546 | 0.026001 | 0.004122 |
| 82 | 0.35106 | −0.31701 | 0.026001 | 0.004122 |
| 83 | 0.22865 | −0.22594 | 0.026001 | 0.004122 |
| 84 | 0.10005 | −0.14387 | 0.026001 | 0.004122 |
| 85 | −0.03446 | −0.07186 | 0.026001 | 0.004122 |
| 86 | −0.17416 | −0.01055 | 0.026001 | 0.004122 |
| 87 | −0.31919 | 0.03679 | 0.026001 | 0.004122 |
| 88 | −0.46885 | 0.06645 | 0.026001 | 0.004122 |
| 89 | −0.62105 | 0.07699 | 0.026001 | 0.004122 |
| 90 | −0.77338 | 0.06846 | 0.026001 | 0.004122 |
| 91 | −0.92392 | 0.04373 | 0.026001 | 0.004122 |
| 92 | −1.07126 | 0.00415 | 0.026001 | 0.004122 |
| 93 | −1.20974 | −0.04658 | 0.026001 | 0.004122 |
| 94 | −1.34337 | −0.10899 | 0.026001 | 0.004122 |
| 95 | −1.46724 | −0.17922 | 0.026001 | 0.004122 |
| 96 | −1.5786 | −0.25051 | 0.026001 | 0.004122 |
| 97 | −1.6829 | −0.3232 | 0.026001 | 0.004122 |
| 98 | −1.77566 | −0.39446 | 0.026001 | 0.004122 |
| 99 | −1.85759 | −0.46296 | 0.026001 | 0.004122 |
| 100 | −1.93083 | −0.52599 | 0.026001 | 0.004122 |
| 101 | −1.99656 | −0.58214 | 0.026001 | 0.004122 |
| 102 | −2.05647 | −0.62937 | 0.026001 | 0.004122 |
| 103 | −2.11372 | −0.66243 | 0.026001 | 0.004122 |
| 104 | −2.16703 | −0.67936 | 0.026001 | 0.004122 |
| 105 | −2.21264 | −0.68318 | 0.026001 | 0.004122 |
| 106 | −2.24809 | −0.67988 | 0.026001 | 0.004122 |
| 107 | −2.27287 | −0.67418 | 0.026001 | 0.004122 |
| 108 | −2.29215 | −0.66769 | 0.026001 | 0.004122 |
| 109 | −2.30618 | −0.66171 | 0.026001 | 0.004122 |
| 110 | −2.3153 | −0.6572 | 0.026001 | 0.004122 |
| 111 | −2.32422 | −0.65231 | 0.026001 | 0.004122 |
| 112 | −2.32859 | −0.64971 | 0.026001 | 0.004122 |

TABLE I-continued

| SECTION 3 | | Suction Side | | |
|---|---|---|---|---|
| Pt. | X | Y | Z | %-Span |
| 1 | −2.28286 | −0.49833 | 0.883003 | 0.139981 |
| 2 | −2.28867 | −0.49456 | 0.883003 | 0.139981 |
| 3 | −2.29435 | −0.49059 | 0.883003 | 0.139981 |
| 4 | −2.30524 | −0.48203 | 0.883003 | 0.139981 |
| 5 | −2.31539 | −0.47261 | 0.883003 | 0.139981 |
| 6 | −2.32899 | −0.4569 | 0.883003 | 0.139981 |
| 7 | −2.34392 | −0.43356 | 0.883003 | 0.139981 |
| 8 | −2.35819 | −0.402 | 0.883003 | 0.139981 |
| 9 | −2.37142 | −0.35536 | 0.883003 | 0.139981 |
| 10 | −2.3793 | −0.29352 | 0.883003 | 0.139981 |
| 11 | −2.37809 | −0.21734 | 0.883003 | 0.139981 |
| 12 | −2.36426 | −0.12837 | 0.883003 | 0.139981 |
| 13 | −2.33597 | −0.0284 | 0.883003 | 0.139981 |
| 14 | −2.29225 | 0.08094 | 0.883003 | 0.139981 |
| 15 | −2.23305 | 0.19847 | 0.883003 | 0.139981 |
| 16 | −2.15917 | 0.32376 | 0.883003 | 0.139981 |
| 17 | −2.07063 | 0.4562 | 0.883003 | 0.139981 |
| 18 | −1.96579 | 0.59402 | 0.883003 | 0.139981 |
| 19 | −1.84738 | 0.7297 | 0.883003 | 0.139981 |
| 20 | −1.70896 | 0.86553 | 0.883003 | 0.139981 |
| 21 | −1.55291 | 0.99201 | 0.883003 | 0.139981 |
| 22 | −1.38433 | 1.10122 | 0.883003 | 0.139981 |
| 23 | −1.19805 | 1.19329 | 0.883003 | 0.139981 |
| 24 | −1.00127 | 1.26004 | 0.883003 | 0.139981 |
| 25 | −0.79684 | 1.29727 | 0.883003 | 0.139981 |
| 26 | −0.58906 | 1.29896 | 0.883003 | 0.139981 |
| 27 | −0.3846 | 1.26189 | 0.883003 | 0.139981 |
| 28 | −0.1904 | 1.18796 | 0.883003 | 0.139981 |
| 29 | −0.01154 | 1.0822 | 0.883003 | 0.139981 |
| 30 | 0.15006 | 0.95158 | 0.883003 | 0.139981 |
| 31 | 0.29654 | 0.8042 | 0.883003 | 0.139981 |
| 32 | 0.43065 | 0.64548 | 0.883003 | 0.139981 |
| 33 | 0.55603 | 0.47978 | 0.883003 | 0.139981 |
| 34 | 0.67476 | 0.30925 | 0.883003 | 0.139981 |
| 35 | 0.78754 | 0.13473 | 0.883003 | 0.139981 |
| 36 | 0.89448 | −0.04343 | 0.883003 | 0.139981 |
| 37 | 0.99172 | −0.21919 | 0.883003 | 0.139981 |
| 38 | 1.08395 | −0.39763 | 0.883003 | 0.139981 |
| 39 | 1.16827 | −0.57228 | 0.883003 | 0.139981 |
| 40 | 1.24262 | −0.7363 | 0.883003 | 0.139981 |
| 41 | 1.31046 | −0.89562 | 0.883003 | 0.139981 |
| 42 | 1.37106 | −1.04295 | 0.883003 | 0.139981 |
| 43 | 1.42491 | −1.17807 | 0.883003 | 0.139981 |
| 44 | 1.47259 | −1.30073 | 0.883003 | 0.139981 |
| 45 | 1.51439 | −1.41081 | 0.883003 | 0.139981 |
| 46 | 1.55054 | −1.50821 | 0.883003 | 0.139981 |
| 47 | 1.58163 | −1.59272 | 0.883003 | 0.139981 |
| 48 | 1.6072 | −1.66449 | 0.883003 | 0.139981 |
| 49 | 1.62832 | −1.72314 | 0.883003 | 0.139981 |
| 50 | 1.64197 | −1.76966 | 0.883003 | 0.139981 |
| 51 | 1.64563 | −1.8041 | 0.883003 | 0.139981 |
| 52 | 1.6408 | −1.83138 | 0.883003 | 0.139981 |
| 53 | 1.63174 | −1.85008 | 0.883003 | 0.139981 |
| 54 | 1.6234 | −1.86114 | 0.883003 | 0.139981 |
| 55 | 1.61345 | −1.87078 | 0.883003 | 0.139981 |
| 56 | 1.60795 | −1.87499 | 0.883003 | 0.139981 |

| SECTION 3 | | Pressure Side | | |
|---|---|---|---|---|
| Pt. | X | Y | Z | %-Span |
| 57 | 1.60214 | −1.87876 | 0.883003 | 0.139981 |
| 58 | 1.59782 | −1.88116 | 0.883003 | 0.139981 |
| 59 | 1.59339 | −1.88333 | 0.883003 | 0.139981 |
| 60 | 1.58418 | −1.8869 | 0.883003 | 0.139981 |
| 61 | 1.57463 | −1.88943 | 0.883003 | 0.139981 |
| 62 | 1.55992 | −1.89122 | 0.883003 | 0.139981 |
| 63 | 1.54022 | −1.88975 | 0.883003 | 0.139981 |
| 64 | 1.51692 | −1.88159 | 0.883003 | 0.139981 |
| 65 | 1.49148 | −1.85817 | 0.883003 | 0.139981 |
| 66 | 1.46605 | −1.82172 | 0.883003 | 0.139981 |
| 67 | 1.43743 | −1.77554 | 0.883003 | 0.139981 |
| 68 | 1.40436 | −1.72051 | 0.883003 | 0.139981 |
| 69 | 1.36651 | −1.65683 | 0.883003 | 0.139981 |
| 70 | 1.32319 | −1.5849 | 0.883003 | 0.139981 |
| 71 | 1.27414 | −1.50491 | 0.883003 | 0.139981 |
| 72 | 1.21915 | −1.41697 | 0.883003 | 0.139981 |
| 73 | 1.15765 | −1.32147 | 0.883003 | 0.139981 |
| 74 | 1.08883 | −1.21896 | 0.883003 | 0.139981 |
| 75 | 1.01506 | −1.11385 | 0.883003 | 0.139981 |
| 76 | 0.93297 | −1.00257 | 0.883003 | 0.139981 |
| 77 | 0.84468 | −0.88979 | 0.883003 | 0.139981 |
| 78 | 0.75299 | −0.77976 | 0.883003 | 0.139981 |
| 79 | 0.65495 | −0.66868 | 0.883003 | 0.139981 |
| 80 | 0.55378 | −0.56043 | 0.883003 | 0.139981 |
| 81 | 0.44861 | −0.45606 | 0.883003 | 0.139981 |
| 82 | 0.33876 | −0.35664 | 0.883003 | 0.139981 |
| 83 | 0.22398 | −0.26295 | 0.883003 | 0.139981 |
| 84 | 0.10403 | −0.17598 | 0.883003 | 0.139981 |
| 85 | −0.02157 | −0.09739 | 0.883003 | 0.139981 |
| 86 | −0.15297 | −0.02893 | 0.883003 | 0.139981 |
| 87 | −0.28979 | 0.02794 | 0.883003 | 0.139981 |
| 88 | −0.43149 | 0.07123 | 0.883003 | 0.139981 |
| 89 | −0.577 | 0.09911 | 0.883003 | 0.139981 |
| 90 | −0.72477 | 0.1099 | 0.883003 | 0.139981 |
| 91 | −0.87279 | 0.10322 | 0.883003 | 0.139981 |
| 92 | −1.01916 | 0.08024 | 0.883003 | 0.139981 |
| 93 | −1.15743 | 0.04289 | 0.883003 | 0.139981 |
| 94 | −1.29137 | −0.00783 | 0.883003 | 0.139981 |
| 95 | −1.41647 | −0.06676 | 0.883003 | 0.139981 |
| 96 | −1.52879 | −0.12899 | 0.883003 | 0.139981 |
| 97 | −1.63319 | −0.19491 | 0.883003 | 0.139981 |
| 98 | −1.72626 | −0.26003 | 0.883003 | 0.139981 |
| 99 | −1.80883 | −0.3228 | 0.883003 | 0.139981 |
| 100 | −1.88243 | −0.38101 | 0.883003 | 0.139981 |
| 101 | −1.9494 | −0.43164 | 0.883003 | 0.139981 |
| 102 | −2.01153 | −0.47199 | 0.883003 | 0.139981 |
| 103 | −2.06887 | −0.50087 | 0.883003 | 0.139981 |
| 104 | −2.12061 | −0.51746 | 0.883003 | 0.139981 |
| 105 | −2.16448 | −0.52456 | 0.883003 | 0.139981 |
| 106 | −2.19905 | −0.52522 | 0.883003 | 0.139981 |
| 107 | −2.22354 | −0.52203 | 0.883003 | 0.139981 |
| 108 | −2.24263 | −0.51697 | 0.883003 | 0.139981 |
| 109 | −2.25656 | −0.51192 | 0.883003 | 0.139981 |
| 110 | −2.26558 | −0.50789 | 0.883003 | 0.139981 |
| 111 | −2.27435 | −0.50335 | 0.883003 | 0.139981 |
| 112 | −2.27864 | −0.5009 | 0.883003 | 0.139981 |

| SECTION 4 | | Suction Side | | |
|---|---|---|---|---|
| Pt. | X | Y | Z | %-Span |
| 1 | −2.22479 | −0.32534 | 1.883003 | 0.298510 |
| 2 | −2.23003 | −0.32139 | 1.883003 | 0.298510 |
| 3 | −2.23511 | −0.31722 | 1.883003 | 0.298510 |
| 4 | −2.24472 | −0.30827 | 1.883003 | 0.298510 |
| 5 | −2.25356 | −0.29855 | 1.883003 | 0.298510 |
| 6 | −2.26533 | −0.28275 | 1.883003 | 0.298510 |
| 7 | −2.27823 | −0.25987 | 1.883003 | 0.298510 |
| 8 | −2.29018 | −0.22928 | 1.883003 | 0.298510 |
| 9 | −2.30034 | −0.18444 | 1.883003 | 0.298510 |
| 10 | −2.30487 | −0.1255 | 1.883003 | 0.298510 |
| 11 | −2.30045 | −0.05339 | 1.883003 | 0.298510 |
| 12 | −2.28414 | 0.03041 | 1.883003 | 0.298510 |
| 13 | −2.25355 | 0.12406 | 1.883003 | 0.298510 |
| 14 | −2.2069 | 0.2255 | 1.883003 | 0.298510 |
| 15 | −2.14401 | 0.33329 | 1.883003 | 0.298510 |
| 16 | −2.06553 | 0.4467 | 1.883003 | 0.298510 |
| 17 | −1.97195 | 0.56529 | 1.883003 | 0.298510 |
| 18 | −1.8625 | 0.68769 | 1.883003 | 0.298510 |
| 19 | −1.74001 | 0.80666 | 1.883003 | 0.298510 |
| 20 | −1.59792 | 0.92341 | 1.883003 | 0.298510 |
| 21 | −1.43961 | 1.02931 | 1.883003 | 0.298510 |
| 22 | −1.2708 | 1.11752 | 1.883003 | 0.298510 |
| 23 | −1.08619 | 1.18638 | 1.883003 | 0.298510 |
| 24 | −0.89346 | 1.22733 | 1.883003 | 0.298510 |
| 25 | −0.69663 | 1.23655 | 1.883003 | 0.298510 |
| 26 | −0.50133 | 1.2105 | 1.883003 | 0.298510 |
| 27 | −0.31438 | 1.14827 | 1.883003 | 0.298510 |
| 28 | −0.14151 | 1.05372 | 1.883003 | 0.298510 |
| 29 | 0.01691 | 0.93656 | 1.883003 | 0.298510 |
| 30 | 0.1615 | 0.80271 | 1.883003 | 0.298510 |
| 31 | 0.29342 | 0.65635 | 1.883003 | 0.298510 |
| 32 | 0.41515 | 0.50142 | 1.883003 | 0.298510 |
| 33 | 0.53012 | 0.34141 | 1.883003 | 0.298510 |
| 34 | 0.64067 | 0.17831 | 1.883003 | 0.298510 |

TABLE I-continued

| Pt. | X | Y | Z | %-Span |
|---|---|---|---|---|
| 35 | 0.7465 | 0.0121 | 1.883003 | 0.298510 |
| 36 | 0.84634 | −0.15776 | 1.883003 | 0.298510 |
| 37 | 0.93746 | −0.32502 | 1.883003 | 0.298510 |
| 38 | 1.02464 | −0.49437 | 1.883003 | 0.298510 |
| 39 | 1.10588 | −0.65935 | 1.883003 | 0.298510 |
| 40 | 1.17754 | −0.81435 | 1.883003 | 0.298510 |
| 41 | 1.24349 | −0.96472 | 1.883003 | 0.298510 |
| 42 | 1.3029 | −1.10361 | 1.883003 | 0.298510 |
| 43 | 1.35581 | −1.23098 | 1.883003 | 0.298510 |
| 44 | 1.40291 | −1.34654 | 1.883003 | 0.298510 |
| 45 | 1.44403 | −1.45034 | 1.883003 | 0.298510 |
| 46 | 1.47961 | −1.54221 | 1.883003 | 0.298510 |
| 47 | 1.51027 | −1.6219 | 1.883003 | 0.298510 |
| 48 | 1.53565 | −1.68954 | 1.883003 | 0.298510 |
| 49 | 1.55675 | −1.74476 | 1.883003 | 0.298510 |
| 50 | 1.5697 | −1.78887 | 1.883003 | 0.298510 |
| 51 | 1.57134 | −1.82167 | 1.883003 | 0.298510 |
| 52 | 1.56436 | −1.84699 | 1.883003 | 0.298510 |
| 53 | 1.55313 | −1.86318 | 1.883003 | 0.298510 |
| 54 | 1.5436 | −1.87223 | 1.883003 | 0.298510 |
| 55 | 1.53292 | −1.87988 | 1.883003 | 0.298510 |
| 56 | 1.52719 | −1.88309 | 1.883003 | 0.298510 |

| SECTION 4 | | Pressure Side | | |
|---|---|---|---|---|
| Pt. | X | Y | Z | %-Span |
| 57 | 1.52125 | −1.88588 | 1.883003 | 0.298510 |
| 58 | 1.51682 | −1.88764 | 1.883003 | 0.298510 |
| 59 | 1.5123 | −1.88916 | 1.883003 | 0.298510 |
| 60 | 1.50305 | −1.89148 | 1.883003 | 0.298510 |
| 61 | 1.49362 | −1.89281 | 1.883003 | 0.298510 |
| 62 | 1.47932 | −1.89296 | 1.883003 | 0.298510 |
| 63 | 1.46054 | −1.88967 | 1.883003 | 0.298510 |
| 64 | 1.43953 | −1.87843 | 1.883003 | 0.298510 |
| 65 | 1.41707 | −1.85375 | 1.883003 | 0.298510 |
| 66 | 1.39292 | −1.8183 | 1.883003 | 0.298510 |
| 67 | 1.36569 | −1.7735 | 1.883003 | 0.298510 |
| 68 | 1.33389 | −1.72032 | 1.883003 | 0.298510 |
| 69 | 1.29711 | −1.65901 | 1.883003 | 0.298510 |
| 70 | 1.25489 | −1.58985 | 1.883003 | 0.298510 |
| 71 | 1.20728 | −1.51282 | 1.883003 | 0.298510 |
| 72 | 1.15405 | −1.42805 | 1.883003 | 0.298510 |
| 73 | 1.09445 | −1.33604 | 1.883003 | 0.298510 |
| 74 | 1.02777 | −1.23729 | 1.883003 | 0.298510 |
| 75 | 0.95641 | −1.13597 | 1.883003 | 0.298510 |
| 76 | 0.87727 | −1.02852 | 1.883003 | 0.298510 |
| 77 | 0.79248 | −0.91935 | 1.883003 | 0.298510 |
| 78 | 0.70484 | −0.81247 | 1.883003 | 0.298510 |
| 79 | 0.61173 | −0.70394 | 1.883003 | 0.298510 |
| 80 | 0.51619 | −0.59756 | 1.883003 | 0.298510 |
| 81 | 0.41729 | −0.49429 | 1.883003 | 0.298510 |
| 82 | 0.3148 | −0.39458 | 1.883003 | 0.298510 |
| 83 | 0.2084 | −0.29905 | 1.883003 | 0.298510 |
| 84 | 0.09733 | −0.209 | 1.883003 | 0.298510 |
| 85 | −0.01947 | −0.12652 | 1.883003 | 0.298510 |
| 86 | −0.14212 | −0.05301 | 1.883003 | 0.298510 |
| 87 | −0.26987 | 0.01122 | 1.883003 | 0.298510 |
| 88 | −0.40233 | 0.06507 | 1.883003 | 0.298510 |
| 89 | −0.53933 | 0.10602 | 1.883003 | 0.298510 |
| 90 | −0.67987 | 0.13234 | 1.883003 | 0.298510 |
| 91 | −0.82249 | 0.14267 | 1.883003 | 0.298510 |
| 92 | −0.96535 | 0.13659 | 1.883003 | 0.298510 |
| 93 | −1.10181 | 0.11462 | 1.883003 | 0.298510 |
| 94 | −1.23523 | 0.07848 | 1.883003 | 0.298510 |
| 95 | −1.36047 | 0.03238 | 1.883003 | 0.298510 |
| 96 | −1.47309 | −0.01934 | 1.883003 | 0.298510 |
| 97 | −1.5777 | −0.07639 | 1.883003 | 0.298510 |
| 98 | −1.67107 | −0.13382 | 1.883003 | 0.298510 |
| 99 | −1.75424 | −0.18952 | 1.883003 | 0.298510 |
| 100 | −1.82866 | −0.24112 | 1.883003 | 0.298510 |
| 101 | −1.89671 | −0.2851 | 1.883003 | 0.298510 |
| 102 | −1.95968 | −0.31896 | 1.883003 | 0.298510 |
| 103 | −2.01743 | −0.34139 | 1.883003 | 0.298510 |
| 104 | −2.06881 | −0.35188 | 1.883003 | 0.298510 |
| 105 | −2.11157 | −0.35523 | 1.883003 | 0.298510 |
| 106 | −2.14491 | −0.35393 | 1.883003 | 0.298510 |
| 107 | −2.16843 | −0.3501 | 1.883003 | 0.298510 |
| 108 | −2.18678 | −0.34491 | 1.883003 | 0.298510 |
| 109 | −2.20007 | −0.33963 | 1.883003 | 0.298510 |
| 110 | −2.20862 | −0.33542 | 1.883003 | 0.298510 |
| 111 | −2.21688 | −0.33066 | 1.883003 | 0.298510 |
| 112 | −2.22088 | −0.32807 | 1.883003 | 0.298510 |

| SECTION 5 | | Suction Side | | |
|---|---|---|---|---|
| Pt. | X | Y | Z | %-Span |
| 1 | −2.15278 | −0.11084 | 3.123001 | 0.495086 |
| 2 | −2.15714 | −0.10654 | 3.123001 | 0.495086 |
| 3 | −2.16134 | −0.10209 | 3.123001 | 0.495086 |
| 4 | −2.16923 | −0.09273 | 3.123001 | 0.495086 |
| 5 | −2.17643 | −0.08283 | 3.123001 | 0.495086 |
| 6 | −2.18593 | −0.06712 | 3.123001 | 0.495086 |
| 7 | −2.19618 | −0.04488 | 3.123001 | 0.495086 |
| 8 | −2.20529 | −0.01566 | 3.123001 | 0.495086 |
| 9 | −2.21182 | 0.02668 | 3.123001 | 0.495086 |
| 10 | −2.21079 | 0.08176 | 3.123001 | 0.495086 |
| 11 | −2.19939 | 0.14812 | 3.123001 | 0.495086 |
| 12 | −2.17714 | 0.22452 | 3.123001 | 0.495086 |
| 13 | −2.14112 | 0.30897 | 3.123001 | 0.495086 |
| 14 | −2.0893 | 0.3992 | 3.123001 | 0.495086 |
| 15 | −2.02206 | 0.49409 | 3.123001 | 0.495086 |
| 16 | −1.93965 | 0.59274 | 3.123001 | 0.495086 |
| 17 | −1.84179 | 0.69395 | 3.123001 | 0.495086 |
| 18 | −1.72786 | 0.79611 | 3.123001 | 0.495086 |
| 19 | −1.60124 | 0.89252 | 3.123001 | 0.495086 |
| 20 | −1.45543 | 0.9826 | 3.123001 | 0.495086 |
| 21 | −1.29486 | 1.05826 | 3.123001 | 0.495086 |
| 22 | −1.12636 | 1.11409 | 3.123001 | 0.495086 |
| 23 | −0.94569 | 1.14694 | 3.123001 | 0.495086 |
| 24 | −0.76211 | 1.15124 | 3.123001 | 0.495086 |
| 25 | −0.58036 | 1.12507 | 3.123001 | 0.495086 |
| 26 | −0.4059 | 1.06775 | 3.123001 | 0.495086 |
| 27 | −0.24363 | 0.9818 | 3.123001 | 0.495086 |
| 28 | −0.09387 | 0.87554 | 3.123001 | 0.495086 |
| 29 | 0.04407 | 0.75433 | 3.123001 | 0.495086 |
| 30 | 0.17123 | 0.62185 | 3.123001 | 0.495086 |
| 31 | 0.28845 | 0.4805 | 3.123001 | 0.495086 |
| 32 | 0.39769 | 0.3329 | 3.123001 | 0.495086 |
| 33 | 0.50153 | 0.18145 | 3.123001 | 0.495086 |
| 34 | 0.60213 | 0.02783 | 3.123001 | 0.495086 |
| 35 | 0.69842 | −0.12853 | 3.123001 | 0.495086 |
| 36 | 0.78978 | −0.28782 | 3.123001 | 0.495086 |
| 37 | 0.87435 | −0.44389 | 3.123001 | 0.495086 |
| 38 | 0.95615 | −0.60142 | 3.123001 | 0.495086 |
| 39 | 1.03241 | −0.75491 | 3.123001 | 0.495086 |
| 40 | 1.10013 | −0.89893 | 3.123001 | 0.495086 |
| 41 | 1.16313 | −1.03838 | 3.123001 | 0.495086 |
| 42 | 1.22024 | −1.16706 | 3.123001 | 0.495086 |
| 43 | 1.27159 | −1.2849 | 3.123001 | 0.495086 |
| 44 | 1.31739 | −1.3918 | 3.123001 | 0.495086 |
| 45 | 1.35747 | −1.48783 | 3.123001 | 0.495086 |
| 46 | 1.39227 | −1.5728 | 3.123001 | 0.495086 |
| 47 | 1.42224 | −1.64651 | 3.123001 | 0.495086 |
| 48 | 1.44712 | −1.70908 | 3.123001 | 0.495086 |
| 49 | 1.46817 | −1.75998 | 3.123001 | 0.495086 |
| 50 | 1.48174 | −1.80062 | 3.123001 | 0.495086 |
| 51 | 1.48365 | −1.83117 | 3.123001 | 0.495086 |
| 52 | 1.47526 | −1.85417 | 3.123001 | 0.495086 |
| 53 | 1.46432 | −1.86892 | 3.123001 | 0.495086 |
| 54 | 1.4554 | −1.8773 | 3.123001 | 0.495086 |
| 55 | 1.44537 | −1.88433 | 3.123001 | 0.495086 |
| 56 | 1.44002 | −1.88729 | 3.123001 | 0.495086 |

| SECTION 5 | | Pressure Side | | |
|---|---|---|---|---|
| Pt. | X | Y | Z | %-Span |
| 57 | 1.43446 | −1.88986 | 3.123001 | 0.495086 |
| 58 | 1.43018 | −1.89152 | 3.123001 | 0.495086 |
| 59 | 1.42581 | −1.89296 | 3.123001 | 0.495086 |
| 60 | 1.41688 | −1.89512 | 3.123001 | 0.495086 |
| 61 | 1.40777 | −1.89631 | 3.123001 | 0.495086 |
| 62 | 1.39399 | −1.89625 | 3.123001 | 0.495086 |
| 63 | 1.37594 | −1.89279 | 3.123001 | 0.495086 |
| 64 | 1.35536 | −1.88259 | 3.123001 | 0.495086 |
| 65 | 1.33191 | −1.86058 | 3.123001 | 0.495086 |
| 66 | 1.30769 | −1.82707 | 3.123001 | 0.495086 |
| 67 | 1.28131 | −1.78396 | 3.123001 | 0.495086 |

TABLE I-continued

| Pt. | X | Y | Z | %-Span |
|---|---|---|---|---|
| 68 | 1.25045 | −1.73283 | 3.123001 | 0.495086 |
| 69 | 1.21472 | −1.67391 | 3.123001 | 0.495086 |
| 70 | 1.17396 | −1.60729 | 3.123001 | 0.495086 |
| 71 | 1.12807 | −1.53304 | 3.123001 | 0.495086 |
| 72 | 1.07676 | −1.45134 | 3.123001 | 0.495086 |
| 73 | 1.0195 | −1.36253 | 3.123001 | 0.495086 |
| 74 | 0.95577 | −1.26698 | 3.123001 | 0.495086 |
| 75 | 0.88793 | −1.16867 | 3.123001 | 0.495086 |
| 76 | 0.81286 | −1.06421 | 3.123001 | 0.495086 |
| 77 | 0.73287 | −0.95767 | 3.123001 | 0.495086 |
| 78 | 0.65072 | −0.85278 | 3.123001 | 0.495086 |
| 79 | 0.56373 | −0.74588 | 3.123001 | 0.495086 |
| 80 | 0.47457 | −0.64078 | 3.123001 | 0.495086 |
| 81 | 0.38273 | −0.53802 | 3.123001 | 0.495086 |
| 82 | 0.28775 | −0.43814 | 3.123001 | 0.495086 |
| 83 | 0.18923 | −0.34177 | 3.123001 | 0.495086 |
| 84 | 0.08629 | −0.25012 | 3.123001 | 0.495086 |
| 85 | −0.02221 | −0.16513 | 3.123001 | 0.495086 |
| 86 | −0.1356 | −0.08679 | 3.123001 | 0.495086 |
| 87 | −0.25347 | −0.01536 | 3.123001 | 0.495086 |
| 88 | −0.37598 | 0.04778 | 3.123001 | 0.495086 |
| 89 | −0.50333 | 0.10049 | 3.123001 | 0.495086 |
| 90 | −0.63494 | 0.14139 | 3.123001 | 0.495086 |
| 91 | −0.76995 | 0.16907 | 3.123001 | 0.495086 |
| 92 | −0.90721 | 0.18158 | 3.123001 | 0.495086 |
| 93 | −1.0404 | 0.17827 | 3.123001 | 0.495086 |
| 94 | −1.17247 | 0.16072 | 3.123001 | 0.495086 |
| 95 | −1.2976 | 0.13091 | 3.123001 | 0.495086 |
| 96 | −1.41074 | 0.0926 | 3.123001 | 0.495086 |
| 97 | −1.51619 | 0.04711 | 3.123001 | 0.495086 |
| 98 | −1.61039 | −0.00077 | 3.123001 | 0.495086 |
| 99 | −1.69466 | −0.04774 | 3.123001 | 0.495086 |
| 100 | −1.77068 | −0.09063 | 3.123001 | 0.495086 |
| 101 | −1.84 | −0.12662 | 3.123001 | 0.495086 |
| 102 | −1.90389 | −0.15243 | 3.123001 | 0.495086 |
| 103 | −1.96192 | −0.16654 | 3.123001 | 0.495086 |
| 104 | −2.01235 | −0.16992 | 3.123001 | 0.495086 |
| 105 | −2.05346 | −0.16561 | 3.123001 | 0.495086 |
| 106 | −2.08422 | −0.15624 | 3.123001 | 0.495086 |
| 107 | −2.10496 | −0.14636 | 3.123001 | 0.495086 |
| 108 | −2.12065 | −0.13679 | 3.123001 | 0.495086 |
| 109 | −2.13184 | −0.12875 | 3.123001 | 0.495086 |
| 110 | −2.13904 | −0.12304 | 3.123001 | 0.495086 |
| 111 | −2.14601 | −0.11706 | 3.123001 | 0.495086 |
| 112 | −2.14942 | −0.11398 | 3.123001 | 0.495086 |

SECTION 6 — Suction Side

| Pt. | X | Y | Z | %-Span |
|---|---|---|---|---|
| 1 | −2.08077 | 0.10366 | 4.363003 | 0.691662 |
| 2 | −2.08456 | 0.10799 | 4.363003 | 0.691662 |
| 3 | −2.08817 | 0.11247 | 4.363003 | 0.691662 |
| 4 | −2.09489 | 0.12181 | 4.363003 | 0.691662 |
| 5 | −2.10092 | 0.13161 | 4.363003 | 0.691662 |
| 6 | −2.10865 | 0.14704 | 4.363003 | 0.691662 |
| 7 | −2.11657 | 0.16865 | 4.363003 | 0.691662 |
| 8 | −2.1228 | 0.19673 | 4.363003 | 0.691662 |
| 9 | −2.12505 | 0.23694 | 4.363003 | 0.691662 |
| 10 | −2.11973 | 0.28844 | 4.363003 | 0.691662 |
| 11 | −2.10498 | 0.34998 | 4.363003 | 0.691662 |
| 12 | −2.07819 | 0.41981 | 4.363003 | 0.691662 |
| 13 | −2.03778 | 0.49606 | 4.363003 | 0.691662 |
| 14 | −1.98284 | 0.57698 | 4.363003 | 0.691662 |
| 15 | −1.91291 | 0.66099 | 4.363003 | 0.691662 |
| 16 | −1.82744 | 0.74638 | 4.363003 | 0.691662 |
| 17 | −1.7256 | 0.83086 | 4.363003 | 0.691662 |
| 18 | −1.60688 | 0.91206 | 4.363003 | 0.691662 |
| 19 | −1.47549 | 0.98356 | 4.363003 | 0.691662 |
| 20 | −1.32623 | 1.04414 | 4.363003 | 0.691662 |
| 21 | −1.16509 | 1.08738 | 4.363003 | 0.691662 |
| 22 | −0.99969 | 1.10923 | 4.363003 | 0.691662 |
| 23 | −0.82711 | 1.10649 | 4.363003 | 0.691662 |
| 24 | −0.65706 | 1.07699 | 4.363003 | 0.691662 |
| 25 | −0.49372 | 1.02124 | 4.363003 | 0.691662 |
| 26 | −0.34128 | 0.94031 | 4.363003 | 0.691662 |
| 27 | −0.20041 | 0.84059 | 4.363003 | 0.691662 |
| 28 | −0.0696 | 0.72799 | 4.363003 | 0.691662 |
| 29 | 0.05166 | 0.60517 | 4.363003 | 0.691662 |
| 30 | 0.1645 | 0.47457 | 4.363003 | 0.691662 |
| 31 | 0.27034 | 0.33824 | 4.363003 | 0.691662 |
| 32 | 0.37018 | 0.19745 | 4.363003 | 0.691662 |
| 33 | 0.46544 | 0.05353 | 4.363003 | 0.691662 |
| 34 | 0.55732 | −0.09258 | 4.363003 | 0.691662 |
| 35 | 0.64558 | −0.2409 | 4.363003 | 0.691662 |
| 36 | 0.73092 | −0.39092 | 4.363003 | 0.691662 |
| 37 | 0.81027 | −0.53768 | 4.363003 | 0.691662 |
| 38 | 0.88719 | −0.68573 | 4.363003 | 0.691662 |
| 39 | 0.96007 | −0.82939 | 4.363003 | 0.691662 |
| 40 | 1.02478 | −0.96425 | 4.363003 | 0.691662 |
| 41 | 1.08535 | −1.0947 | 4.363003 | 0.691662 |
| 42 | 1.14044 | −1.21501 | 4.363003 | 0.691662 |
| 43 | 1.19025 | −1.32508 | 4.363003 | 0.691662 |
| 44 | 1.23467 | −1.42496 | 4.363003 | 0.691662 |
| 45 | 1.27399 | −1.51451 | 4.363003 | 0.691662 |
| 46 | 1.30811 | −1.59378 | 4.363003 | 0.691662 |
| 47 | 1.33705 | −1.66274 | 4.363003 | 0.691662 |
| 48 | 1.36063 | −1.72147 | 4.363003 | 0.691662 |
| 49 | 1.38082 | −1.76915 | 4.363003 | 0.691662 |
| 50 | 1.39379 | −1.80728 | 4.363003 | 0.691662 |
| 51 | 1.39542 | −1.83599 | 4.363003 | 0.691662 |
| 52 | 1.38898 | −1.85809 | 4.363003 | 0.691662 |
| 53 | 1.37877 | −1.872 | 4.363003 | 0.691662 |
| 54 | 1.37029 | −1.87978 | 4.363003 | 0.691662 |
| 55 | 1.36084 | −1.88633 | 4.363003 | 0.691662 |
| 56 | 1.3558 | −1.88912 | 4.363003 | 0.691662 |

SECTION 6 — Pressure Side

| Pt. | X | Y | Z | %-Span |
|---|---|---|---|---|
| 57 | 1.35059 | −1.89155 | 4.363003 | 0.691662 |
| 58 | 1.34644 | −1.89319 | 4.363003 | 0.691662 |
| 59 | 1.34222 | −1.89462 | 4.363003 | 0.691662 |
| 60 | 1.33358 | −1.89679 | 4.363003 | 0.691662 |
| 61 | 1.32475 | −1.89805 | 4.363003 | 0.691662 |
| 62 | 1.31138 | −1.89819 | 4.363003 | 0.691662 |
| 63 | 1.2938 | −1.89524 | 4.363003 | 0.691662 |
| 64 | 1.27352 | −1.88599 | 4.363003 | 0.691662 |
| 65 | 1.24981 | −1.86571 | 4.363003 | 0.691662 |
| 66 | 1.22547 | −1.83382 | 4.363003 | 0.691662 |
| 67 | 1.19961 | −1.79217 | 4.363003 | 0.691662 |
| 68 | 1.1693 | −1.74278 | 4.363003 | 0.691662 |
| 69 | 1.13468 | −1.68559 | 4.363003 | 0.691662 |
| 70 | 1.09521 | −1.6209 | 4.363003 | 0.691662 |
| 71 | 1.05068 | −1.54887 | 4.363003 | 0.691662 |
| 72 | 1.00109 | −1.46948 | 4.363003 | 0.691662 |
| 73 | 0.94582 | −1.38314 | 4.363003 | 0.691662 |
| 74 | 0.88471 | −1.28996 | 4.363003 | 0.691662 |
| 75 | 0.82008 | −1.19376 | 4.363003 | 0.691662 |
| 76 | 0.74902 | −1.09117 | 4.363003 | 0.691662 |
| 77 | 0.6738 | −0.98605 | 4.363003 | 0.691662 |
| 78 | 0.59687 | −0.88217 | 4.363003 | 0.691662 |
| 79 | 0.5154 | −0.77613 | 4.363003 | 0.691662 |
| 80 | 0.43182 | −0.67176 | 4.363003 | 0.691662 |
| 81 | 0.34591 | −0.56929 | 4.363003 | 0.691662 |
| 82 | 0.25739 | −0.46906 | 4.363003 | 0.691662 |
| 83 | 0.16558 | −0.37184 | 4.363003 | 0.691662 |
| 84 | 0.0701 | −0.27823 | 4.363003 | 0.691662 |
| 85 | −0.02942 | −0.18892 | 4.363003 | 0.691662 |
| 86 | −0.13323 | −0.10463 | 4.363003 | 0.691662 |
| 87 | −0.24113 | −0.02565 | 4.363003 | 0.691662 |
| 88 | −0.35326 | 0.0472 | 4.363003 | 0.691662 |
| 89 | −0.47036 | 0.11176 | 4.363003 | 0.691662 |
| 90 | −0.59235 | 0.16652 | 4.363003 | 0.691662 |
| 91 | −0.71868 | 0.21036 | 4.363003 | 0.691662 |
| 92 | −0.84878 | 0.24126 | 4.363003 | 0.691662 |
| 93 | −0.97705 | 0.25719 | 4.363003 | 0.691662 |
| 94 | −1.10631 | 0.25829 | 4.363003 | 0.691662 |
| 95 | −1.23043 | 0.24525 | 4.363003 | 0.691662 |
| 96 | −1.34381 | 0.22128 | 4.363003 | 0.691662 |
| 97 | −1.45026 | 0.18832 | 4.363003 | 0.691662 |
| 98 | −1.54556 | 0.15054 | 4.363003 | 0.691662 |
| 99 | −1.63095 | 0.1122 | 4.363003 | 0.691662 |
| 100 | −1.70838 | 0.07791 | 4.363003 | 0.691662 |
| 101 | −1.77951 | 0.05178 | 4.363003 | 0.691662 |
| 102 | −1.84437 | 0.03555 | 4.363003 | 0.691662 |
| 103 | −1.90199 | 0.02944 | 4.363003 | 0.691662 |
| 104 | −1.95096 | 0.03189 | 4.363003 | 0.691662 |
| 105 | −1.99002 | 0.041 | 4.363003 | 0.691662 |

TABLE I-continued

| Pt. | X | Y | Z | %-Span |
|---|---|---|---|---|
| 106 | −2.01858 | 0.05355 | 4.363003 | 0.691662 |
| 107 | −2.03756 | 0.06523 | 4.363003 | 0.691662 |
| 108 | −2.0518 | 0.07597 | 4.363003 | 0.691662 |
| 109 | −2.06191 | 0.08471 | 4.363003 | 0.691662 |
| 110 | −2.0684 | 0.09083 | 4.363003 | 0.691662 |
| 111 | −2.07468 | 0.09715 | 4.363003 | 0.691662 |
| 112 | −2.07775 | 0.10038 | 4.363003 | 0.691662 |

| SECTION 7 | Suction Side | | | |
|---|---|---|---|---|
| Pt. | X | Y | Z | %-Span |
| 1 | −2.03664 | 0.23513 | 5.123001 | 0.812143 |
| 2 | −2.03987 | 0.23968 | 5.123001 | 0.812143 |
| 3 | −2.04294 | 0.24433 | 5.123001 | 0.812143 |
| 4 | −2.04864 | 0.25392 | 5.123001 | 0.812143 |
| 5 | −2.05376 | 0.26383 | 5.123001 | 0.812143 |
| 6 | −2.06041 | 0.27918 | 5.123001 | 0.812143 |
| 7 | −2.0674 | 0.30037 | 5.123001 | 0.812143 |
| 8 | −2.07284 | 0.32772 | 5.123001 | 0.812143 |
| 9 | −2.07429 | 0.36673 | 5.123001 | 0.812143 |
| 10 | −2.06826 | 0.41656 | 5.123001 | 0.812143 |
| 11 | −2.05172 | 0.47563 | 5.123001 | 0.812143 |
| 12 | −2.02321 | 0.5423 | 5.123001 | 0.812143 |
| 13 | −1.98089 | 0.61446 | 5.123001 | 0.812143 |
| 14 | −1.92414 | 0.69041 | 5.123001 | 0.812143 |
| 15 | −1.85249 | 0.76849 | 5.123001 | 0.812143 |
| 16 | −1.76523 | 0.8466 | 5.123001 | 0.812143 |
| 17 | −1.66159 | 0.9222 | 5.123001 | 0.812143 |
| 18 | −1.54114 | 0.99242 | 5.123001 | 0.812143 |
| 19 | −1.40831 | 1.05059 | 5.123001 | 0.812143 |
| 20 | −1.25846 | 1.09456 | 5.123001 | 0.812143 |
| 21 | −1.09855 | 1.11878 | 5.123001 | 0.812143 |
| 22 | −0.93681 | 1.11951 | 5.123001 | 0.812143 |
| 23 | −0.77139 | 1.0944 | 5.123001 | 0.812143 |
| 24 | −0.61161 | 1.04474 | 5.123001 | 0.812143 |
| 25 | −0.46063 | 0.97264 | 5.123001 | 0.812143 |
| 26 | −0.32044 | 0.88131 | 5.123001 | 0.812143 |
| 27 | −0.19052 | 0.77588 | 5.123001 | 0.812143 |
| 28 | −0.06958 | 0.66026 | 5.123001 | 0.812143 |
| 29 | 0.04332 | 0.53678 | 5.123001 | 0.812143 |
| 30 | 0.14926 | 0.40728 | 5.123001 | 0.812143 |
| 31 | 0.24943 | 0.27326 | 5.123001 | 0.812143 |
| 32 | 0.34447 | 0.13555 | 5.123001 | 0.812143 |
| 33 | 0.4355 | −0.00483 | 5.123001 | 0.812143 |
| 34 | 0.52354 | −0.14711 | 5.123001 | 0.812143 |
| 35 | 0.60849 | −0.29126 | 5.123001 | 0.812143 |
| 36 | 0.691 | −0.43681 | 5.123001 | 0.812143 |
| 37 | 0.76816 | −0.57896 | 5.123001 | 0.812143 |
| 38 | 0.84282 | −0.72244 | 5.123001 | 0.812143 |
| 39 | 0.91343 | −0.86173 | 5.123001 | 0.812143 |
| 40 | 0.9766 | −0.99225 | 5.123001 | 0.812143 |
| 41 | 1.03602 | −1.11838 | 5.123001 | 0.812143 |
| 42 | 1.09019 | −1.23466 | 5.123001 | 0.812143 |
| 43 | 1.13934 | −1.34097 | 5.123001 | 0.812143 |
| 44 | 1.18317 | −1.43746 | 5.123001 | 0.812143 |
| 45 | 1.22198 | −1.52396 | 5.123001 | 0.812143 |
| 46 | 1.25568 | −1.60052 | 5.123001 | 0.812143 |
| 47 | 1.28444 | −1.66713 | 5.123001 | 0.812143 |
| 48 | 1.30806 | −1.7238 | 5.123001 | 0.812143 |
| 49 | 1.32694 | −1.77021 | 5.123001 | 0.812143 |
| 50 | 1.33979 | −1.80715 | 5.123001 | 0.812143 |
| 51 | 1.34043 | −1.835 | 5.123001 | 0.812143 |
| 52 | 1.333 | −1.85609 | 5.123001 | 0.812143 |
| 53 | 1.32352 | −1.86999 | 5.123001 | 0.812143 |
| 54 | 1.31558 | −1.87797 | 5.123001 | 0.812143 |
| 55 | 1.30669 | −1.88484 | 5.123001 | 0.812143 |
| 56 | 1.30198 | −1.88788 | 5.123001 | 0.812143 |

| SECTION 7 | Pressure Side | | | |
|---|---|---|---|---|
| Pt. | X | Y | Z | %-Span |
| 57 | 1.29694 | −1.89034 | 5.123001 | 0.812143 |
| 58 | 1.29303 | −1.89193 | 5.123001 | 0.812143 |
| 59 | 1.28891 | −1.89337 | 5.123001 | 0.812143 |
| 60 | 1.28052 | −1.89589 | 5.123001 | 0.812143 |
| 61 | 1.27184 | −1.89722 | 5.123001 | 0.812143 |
| 62 | 1.25865 | −1.8973 | 5.123001 | 0.812143 |
| 63 | 1.24135 | −1.89439 | 5.123001 | 0.812143 |
| 64 | 1.22157 | −1.8849 | 5.123001 | 0.812143 |
| 65 | 1.19842 | −1.86473 | 5.123001 | 0.812143 |
| 66 | 1.17427 | −1.83349 | 5.123001 | 0.812143 |
| 67 | 1.1481 | −1.79287 | 5.123001 | 0.812143 |
| 68 | 1.1184 | −1.74423 | 5.123001 | 0.812143 |
| 69 | 1.08474 | −1.6877 | 5.123001 | 0.812143 |
| 70 | 1.04621 | −1.62385 | 5.123001 | 0.812143 |
| 71 | 1.00278 | −1.5527 | 5.123001 | 0.812143 |
| 72 | 0.95441 | −1.4743 | 5.123001 | 0.812143 |
| 73 | 0.90055 | −1.38897 | 5.123001 | 0.812143 |
| 74 | 0.84129 | −1.29669 | 5.123001 | 0.812143 |
| 75 | 0.7787 | −1.20133 | 5.123001 | 0.812143 |
| 76 | 0.71002 | −1.0995 | 5.123001 | 0.812143 |
| 77 | 0.63729 | −0.99511 | 5.123001 | 0.812143 |
| 78 | 0.56299 | −0.89184 | 5.123001 | 0.812143 |
| 79 | 0.48438 | −0.78629 | 5.123001 | 0.812143 |
| 80 | 0.40376 | −0.68226 | 5.123001 | 0.812143 |
| 81 | 0.32123 | −0.57974 | 5.123001 | 0.812143 |
| 82 | 0.23646 | −0.47907 | 5.123001 | 0.812143 |
| 83 | 0.14876 | −0.38095 | 5.123001 | 0.812143 |
| 84 | 0.05771 | −0.28591 | 5.123001 | 0.812143 |
| 85 | −0.03675 | −0.19427 | 5.123001 | 0.812143 |
| 86 | −0.13501 | −0.10671 | 5.123001 | 0.812143 |
| 87 | −0.23704 | −0.02358 | 5.123001 | 0.812143 |
| 88 | −0.34323 | 0.05416 | 5.123001 | 0.812143 |
| 89 | −0.45418 | 0.12494 | 5.123001 | 0.812143 |
| 90 | −0.56989 | 0.18766 | 5.123001 | 0.812143 |
| 91 | −0.69029 | 0.2408 | 5.123001 | 0.812143 |
| 92 | −0.81513 | 0.28248 | 5.123001 | 0.812143 |
| 93 | −0.93936 | 0.30989 | 5.123001 | 0.812143 |
| 94 | −1.06591 | 0.32296 | 5.123001 | 0.812143 |
| 95 | −1.18874 | 0.32157 | 5.123001 | 0.812143 |
| 96 | −1.30198 | 0.30789 | 5.123001 | 0.812143 |
| 97 | −1.40907 | 0.28423 | 5.123001 | 0.812143 |
| 98 | −1.50537 | 0.2541 | 5.123001 | 0.812143 |
| 99 | −1.59161 | 0.22171 | 5.123001 | 0.812143 |
| 100 | −1.66975 | 0.19269 | 5.123001 | 0.812143 |
| 101 | −1.7413 | 0.17166 | 5.123001 | 0.812143 |
| 102 | −1.80611 | 0.16027 | 5.123001 | 0.812143 |
| 103 | −1.86307 | 0.15751 | 5.123001 | 0.812143 |
| 104 | −1.91116 | 0.16154 | 5.123001 | 0.812143 |
| 105 | −1.94944 | 0.17121 | 5.123001 | 0.812143 |
| 106 | −1.97741 | 0.18388 | 5.123001 | 0.812143 |
| 107 | −1.99607 | 0.19541 | 5.123001 | 0.812143 |
| 108 | −2.00998 | 0.20611 | 5.123001 | 0.812143 |
| 109 | −2.01961 | 0.21508 | 5.123001 | 0.812143 |
| 110 | −2.02561 | 0.22148 | 5.123001 | 0.812143 |
| 111 | −2.03128 | 0.22818 | 5.123001 | 0.812143 |
| 112 | −2.034 | 0.23162 | 5.123001 | 0.812143 |

| SECTION 8 | Suction Side | | | |
|---|---|---|---|---|
| Pt. | X | Y | Z | %-Span |
| 1 | −1.9925 | 0.3666 | 5.883003 | 0.932625 |
| 2 | −1.99543 | 0.37118 | 5.883003 | 0.932625 |
| 3 | −1.99823 | 0.37584 | 5.883003 | 0.932625 |
| 4 | −2.00344 | 0.38539 | 5.883003 | 0.932625 |
| 5 | −2.00815 | 0.3952 | 5.883003 | 0.932625 |
| 6 | −2.01429 | 0.41031 | 5.883003 | 0.932625 |
| 7 | −2.02074 | 0.43109 | 5.883003 | 0.932625 |
| 8 | −2.02558 | 0.45784 | 5.883003 | 0.932625 |
| 9 | −2.02644 | 0.4959 | 5.883003 | 0.932625 |
| 10 | −2.01932 | 0.54433 | 5.883003 | 0.932625 |
| 11 | −2.00109 | 0.6013 | 5.883003 | 0.932625 |
| 12 | −1.9715 | 0.66551 | 5.883003 | 0.932625 |
| 13 | −1.92769 | 0.73432 | 5.883003 | 0.932625 |
| 14 | −1.869 | 0.80575 | 5.883003 | 0.932625 |
| 15 | −1.79541 | 0.87828 | 5.883003 | 0.932625 |
| 16 | −1.70627 | 0.94967 | 5.883003 | 0.932625 |
| 17 | −1.60111 | 1.0174 | 5.883003 | 0.932625 |
| 18 | −1.47948 | 1.07814 | 5.883003 | 0.932625 |
| 19 | −1.34595 | 1.12466 | 5.883003 | 0.932625 |
| 20 | −1.1964 | 1.15328 | 5.883003 | 0.932625 |
| 21 | −1.0388 | 1.15917 | 5.883003 | 0.932625 |
| 22 | −0.88241 | 1.13878 | 5.883003 | 0.932625 |
| 23 | −0.72633 | 1.09127 | 5.883003 | 0.932625 |
| 24 | −0.57853 | 1.02219 | 5.883003 | 0.932625 |
| 25 | −0.44078 | 0.93477 | 5.883003 | 0.932625 |
| 26 | −0.31181 | 0.83486 | 5.883003 | 0.932625 |

TABLE I-continued

| Pt. | X | Y | Z | %-Span |
|---|---|---|---|---|
| 27 | −0.19139 | 0.72478 | 5.883003 | 0.932625 |
| 28 | −0.07908 | 0.60645 | 5.883003 | 0.932625 |
| 29 | 0.02677 | 0.4823 | 5.883003 | 0.932625 |
| 30 | 0.12711 | 0.35366 | 5.883003 | 0.932625 |
| 31 | 0.22245 | 0.22127 | 5.883003 | 0.932625 |
| 32 | 0.31326 | 0.08572 | 5.883003 | 0.932625 |
| 33 | 0.40074 | −0.05199 | 5.883003 | 0.932625 |
| 34 | 0.48595 | −0.19111 | 5.883003 | 0.932625 |
| 35 | 0.56861 | −0.33177 | 5.883003 | 0.932625 |
| 36 | 0.64874 | −0.47389 | 5.883003 | 0.932625 |
| 37 | 0.72441 | −0.61226 | 5.883003 | 0.932625 |
| 38 | 0.79756 | −0.75197 | 5.883003 | 0.932625 |
| 39 | 0.86547 | −0.88826 | 5.883003 | 0.932625 |
| 40 | 0.92746 | −1.01535 | 5.883003 | 0.932625 |
| 41 | 0.98615 | −1.13798 | 5.883003 | 0.932625 |
| 42 | 1.0396 | −1.25106 | 5.883003 | 0.932625 |
| 43 | 1.08783 | −1.35459 | 5.883003 | 0.932625 |
| 44 | 1.13096 | −1.44848 | 5.883003 | 0.932625 |
| 45 | 1.16928 | −1.53254 | 5.883003 | 0.932625 |
| 46 | 1.2027 | −1.60679 | 5.883003 | 0.932625 |
| 47 | 1.2315 | −1.67155 | 5.883003 | 0.932625 |
| 48 | 1.25531 | −1.72647 | 5.883003 | 0.932625 |
| 49 | 1.27422 | −1.77162 | 5.883003 | 0.932625 |
| 50 | 1.28596 | −1.80783 | 5.883003 | 0.932625 |
| 51 | 1.28593 | −1.83502 | 5.883003 | 0.932625 |
| 52 | 1.27818 | −1.85533 | 5.883003 | 0.932625 |
| 53 | 1.26855 | −1.8686 | 5.883003 | 0.932625 |
| 54 | 1.26097 | −1.87639 | 5.883003 | 0.932625 |
| 55 | 1.25251 | −1.88327 | 5.883003 | 0.932625 |
| 56 | 1.24785 | −1.88614 | 5.883003 | 0.932625 |

| SECTION 8 | Pressure Side | | | |
|---|---|---|---|---|
| Pt. | X | Y | Z | %-Span |
| 57 | 1.24304 | −1.88855 | 5.883003 | 0.932625 |
| 58 | 1.23902 | −1.89013 | 5.883003 | 0.932625 |
| 59 | 1.23491 | −1.89152 | 5.883003 | 0.932625 |
| 60 | 1.22654 | −1.89357 | 5.883003 | 0.932625 |
| 61 | 1.2179 | −1.89464 | 5.883003 | 0.932625 |
| 62 | 1.20492 | −1.89499 | 5.883003 | 0.932625 |
| 63 | 1.18783 | −1.89222 | 5.883003 | 0.932625 |
| 64 | 1.16852 | −1.88245 | 5.883003 | 0.932625 |
| 65 | 1.14626 | −1.86188 | 5.883003 | 0.932625 |
| 66 | 1.12265 | −1.8309 | 5.883003 | 0.932625 |
| 67 | 1.09695 | −1.79072 | 5.883003 | 0.932625 |
| 68 | 1.06753 | −1.74279 | 5.883003 | 0.932625 |
| 69 | 1.03441 | −1.68701 | 5.883003 | 0.932625 |
| 70 | 0.99688 | −1.62372 | 5.883003 | 0.932625 |
| 71 | 0.95451 | −1.55323 | 5.883003 | 0.932625 |
| 72 | 0.90733 | −1.47554 | 5.883003 | 0.932625 |
| 73 | 0.85522 | −1.39072 | 5.883003 | 0.932625 |
| 74 | 0.79796 | −1.2989 | 5.883003 | 0.932625 |
| 75 | 0.73745 | −1.20401 | 5.883003 | 0.932625 |
| 76 | 0.67101 | −1.10266 | 5.883003 | 0.932625 |
| 77 | 0.60038 | −0.99889 | 5.883003 | 0.932625 |
| 78 | 0.52824 | −0.89617 | 5.883003 | 0.932625 |
| 79 | 0.45208 | −0.791 | 5.883003 | 0.932625 |
| 80 | 0.37413 | −0.68715 | 5.883003 | 0.932625 |
| 81 | 0.29487 | −0.58429 | 5.883003 | 0.932625 |
| 82 | 0.21366 | −0.48297 | 5.883003 | 0.932625 |
| 83 | 0.12994 | −0.38371 | 5.883003 | 0.932625 |
| 84 | 0.0431 | −0.28717 | 5.883003 | 0.932625 |
| 85 | −0.0469 | −0.19356 | 5.883003 | 0.932625 |
| 86 | −0.14005 | −0.10309 | 5.883003 | 0.932625 |
| 87 | −0.23654 | −0.0162 | 5.883003 | 0.932625 |
| 88 | −0.33735 | 0.06565 | 5.883003 | 0.932625 |
| 89 | −0.44245 | 0.1419 | 5.883003 | 0.932625 |
| 90 | −0.55169 | 0.2121 | 5.883003 | 0.932625 |
| 91 | −0.66586 | 0.27396 | 5.883003 | 0.932625 |
| 92 | −0.78494 | 0.32574 | 5.883003 | 0.932625 |
| 93 | −0.9045 | 0.36396 | 5.883003 | 0.932625 |
| 94 | −1.02752 | 0.38891 | 5.883003 | 0.932625 |
| 95 | −1.14823 | 0.39979 | 5.883003 | 0.932625 |
| 96 | −1.26073 | 0.39718 | 5.883003 | 0.932625 |
| 97 | −1.3681 | 0.38371 | 5.883003 | 0.932625 |
| 98 | −1.4653 | 0.36219 | 5.883003 | 0.932625 |
| 99 | −1.55244 | 0.33634 | 5.883003 | 0.932625 |
| 100 | −1.63117 | 0.31255 | 5.883003 | 0.932625 |
| 101 | −1.70286 | 0.296 | 5.883003 | 0.932625 |
| 102 | −1.76724 | 0.2876 | 5.883003 | 0.932625 |
| 103 | −1.82349 | 0.28616 | 5.883003 | 0.932625 |
| 104 | −1.87088 | 0.29076 | 5.883003 | 0.932625 |
| 105 | −1.90841 | 0.3012 | 5.883003 | 0.932625 |
| 106 | −1.93574 | 0.3143 | 5.883003 | 0.932625 |
| 107 | −1.95388 | 0.32609 | 5.883003 | 0.932625 |
| 108 | −1.96732 | 0.33701 | 5.883003 | 0.932625 |
| 109 | −1.97655 | 0.34614 | 5.883003 | 0.932625 |
| 110 | −1.98224 | 0.35267 | 5.883003 | 0.932625 |
| 111 | −1.98756 | 0.3595 | 5.883003 | 0.932625 |
| 112 | −1.99008 | 0.36302 | 5.883003 | 0.932625 |

| SECTION 9 | Suction Side | | | |
|---|---|---|---|---|
| Pt. | X | Y | Z | %-Span |
| 1 | −1.96782 | 0.44012 | 6.308002 | 1.000000 |
| 2 | −1.97082 | 0.44458 | 6.308002 | 1.000000 |
| 3 | −1.97369 | 0.44912 | 6.308002 | 1.000000 |
| 4 | −1.97903 | 0.45845 | 6.308002 | 1.000000 |
| 5 | −1.98384 | 0.46806 | 6.308002 | 1.000000 |
| 6 | −1.99 | 0.48296 | 6.308002 | 1.000000 |
| 7 | −1.99621 | 0.50354 | 6.308002 | 1.000000 |
| 8 | −2.00058 | 0.53005 | 6.308002 | 1.000000 |
| 9 | −2.00078 | 0.56767 | 6.308002 | 1.000000 |
| 10 | −1.99264 | 0.61535 | 6.308002 | 1.000000 |
| 11 | −1.9736 | 0.67131 | 6.308002 | 1.000000 |
| 12 | −1.94349 | 0.73436 | 6.308002 | 1.000000 |
| 13 | −1.89899 | 0.80157 | 6.308002 | 1.000000 |
| 14 | −1.8392 | 0.87065 | 6.308002 | 1.000000 |
| 15 | −1.76444 | 0.9402 | 6.308002 | 1.000000 |
| 16 | −1.67419 | 1.00796 | 6.308002 | 1.000000 |
| 17 | −1.56817 | 1.0715 | 6.308002 | 1.000000 |
| 18 | −1.44594 | 1.12726 | 6.308002 | 1.000000 |
| 19 | −1.31218 | 1.16766 | 6.308002 | 1.000000 |
| 20 | −1.16307 | 1.18791 | 6.308002 | 1.000000 |
| 21 | −1.00728 | 1.18372 | 6.308002 | 1.000000 |
| 22 | −0.85476 | 1.15169 | 6.308002 | 1.000000 |
| 23 | −0.70498 | 1.09205 | 6.308002 | 1.000000 |
| 24 | −0.56458 | 1.0128 | 6.308002 | 1.000000 |
| 25 | −0.43463 | 0.91737 | 6.308002 | 1.000000 |
| 26 | −0.31164 | 0.81313 | 6.308002 | 1.000000 |
| 27 | −0.196 | 0.70079 | 6.308002 | 1.000000 |
| 28 | −0.08802 | 0.58107 | 6.308002 | 1.000000 |
| 29 | 0.01435 | 0.45652 | 6.308002 | 1.000000 |
| 30 | 0.11201 | 0.32824 | 6.308002 | 1.000000 |
| 31 | 0.20497 | 0.19652 | 6.308002 | 1.000000 |
| 32 | 0.29365 | 0.06187 | 6.308002 | 1.000000 |
| 33 | 0.37941 | −0.07465 | 6.308002 | 1.000000 |
| 34 | 0.46335 | −0.21229 | 6.308002 | 1.000000 |
| 35 | 0.54503 | −0.35129 | 6.308002 | 1.000000 |
| 36 | 0.62401 | −0.49185 | 6.308002 | 1.000000 |
| 37 | 0.69909 | −0.62842 | 6.308002 | 1.000000 |
| 38 | 0.77164 | −0.76635 | 6.308002 | 1.000000 |
| 39 | 0.8379 | −0.90145 | 6.308002 | 1.000000 |
| 40 | 0.89955 | −1.02684 | 6.308002 | 1.000000 |
| 41 | 0.95809 | −1.14777 | 6.308002 | 1.000000 |
| 42 | 1.01113 | −1.25942 | 6.308002 | 1.000000 |
| 43 | 1.05869 | −1.36176 | 6.308002 | 1.000000 |
| 44 | 1.10163 | −1.4544 | 6.308002 | 1.000000 |
| 45 | 1.13933 | −1.53762 | 6.308002 | 1.000000 |
| 46 | 1.17274 | −1.61098 | 6.308002 | 1.000000 |
| 47 | 1.20203 | −1.67441 | 6.308002 | 1.000000 |
| 48 | 1.22656 | −1.72819 | 6.308002 | 1.000000 |
| 49 | 1.24537 | −1.77276 | 6.308002 | 1.000000 |
| 50 | 1.25606 | −1.80883 | 6.308002 | 1.000000 |
| 51 | 1.2559 | −1.83565 | 6.308002 | 1.000000 |
| 52 | 1.24819 | −1.85575 | 6.308002 | 1.000000 |
| 53 | 1.23885 | −1.86888 | 6.308002 | 1.000000 |
| 54 | 1.23112 | −1.87635 | 6.308002 | 1.000000 |
| 55 | 1.22233 | −1.88253 | 6.308002 | 1.000000 |
| 56 | 1.21758 | −1.88505 | 6.308002 | 1.000000 |

| SECTION 9 | Pressure Side | | | |
|---|---|---|---|---|
| Pt. | X | Y | Z | %-Span |
| 57 | 1.21264 | −1.88717 | 6.308002 | 1.000000 |
| 58 | 1.20858 | −1.8886 | 6.308002 | 1.000000 |
| 59 | 1.20447 | −1.88985 | 6.308002 | 1.000000 |

TABLE I-continued

| Pt. | X | Y | Z | %-Span |
|---|---|---|---|---|
| 60 | 1.19609 | −1.89179 | 6.308002 | 1.000000 |
| 61 | 1.18756 | −1.89295 | 6.308002 | 1.000000 |
| 62 | 1.17466 | −1.89326 | 6.308002 | 1.000000 |
| 63 | 1.15764 | −1.89073 | 6.308002 | 1.000000 |
| 64 | 1.13848 | −1.88096 | 6.308002 | 1.000000 |
| 65 | 1.11686 | −1.86001 | 6.308002 | 1.000000 |
| 66 | 1.09374 | −1.82895 | 6.308002 | 1.000000 |
| 67 | 1.06846 | −1.78895 | 6.308002 | 1.000000 |
| 68 | 1.03933 | −1.74122 | 6.308002 | 1.000000 |
| 69 | 1.00626 | −1.68582 | 6.308002 | 1.000000 |
| 70 | 0.96926 | −1.62274 | 6.308002 | 1.000000 |
| 71 | 0.92734 | −1.55258 | 6.308002 | 1.000000 |
| 72 | 0.88072 | −1.47521 | 6.308002 | 1.000000 |
| 73 | 0.82975 | −1.39041 | 6.308002 | 1.000000 |
| 74 | 0.77362 | −1.29868 | 6.308002 | 1.000000 |
| 75 | 0.71423 | −1.20392 | 6.308002 | 1.000000 |
| 76 | 0.64894 | −1.1027 | 6.308002 | 1.000000 |
| 77 | 0.57933 | −0.99919 | 6.308002 | 1.000000 |
| 78 | 0.50822 | −0.8967 | 6.308002 | 1.000000 |
| 79 | 0.43328 | −0.79164 | 6.308002 | 1.000000 |
| 80 | 0.35672 | −0.68776 | 6.308002 | 1.000000 |
| 81 | 0.27924 | −0.58456 | 6.308002 | 1.000000 |
| 82 | 0.19991 | −0.48277 | 6.308002 | 1.000000 |
| 83 | 0.1183 | −0.38281 | 6.308002 | 1.000000 |
| 84 | 0.03368 | −0.28538 | 6.308002 | 1.000000 |
| 85 | −0.05403 | −0.19072 | 6.308002 | 1.000000 |
| 86 | −0.14445 | −0.09865 | 6.308002 | 1.000000 |
| 87 | −0.23796 | −0.00972 | 6.308002 | 1.000000 |
| 88 | −0.33594 | 0.07426 | 6.308002 | 1.000000 |
| 89 | −0.43783 | 0.15346 | 6.308002 | 1.000000 |
| 90 | −0.54337 | 0.22772 | 6.308002 | 1.000000 |
| 91 | −0.65396 | 0.29422 | 6.308002 | 1.000000 |
| 92 | −0.76967 | 0.35135 | 6.308002 | 1.000000 |
| 93 | −0.88642 | 0.39529 | 6.308002 | 1.000000 |
| 94 | −1.00716 | 0.42667 | 6.308002 | 1.000000 |
| 95 | −1.12629 | 0.44439 | 6.308002 | 1.000000 |
| 96 | −1.23807 | 0.44802 | 6.308002 | 1.000000 |
| 97 | −1.34534 | 0.44035 | 6.308002 | 1.000000 |
| 98 | −1.44288 | 0.42381 | 6.308002 | 1.000000 |
| 99 | −1.53047 | 0.40174 | 6.308002 | 1.000000 |
| 100 | −1.60948 | 0.38083 | 6.308002 | 1.000000 |
| 101 | −1.68125 | 0.3668 | 6.308002 | 1.000000 |
| 102 | −1.7453 | 0.35899 | 6.308002 | 1.000000 |
| 103 | −1.80119 | 0.35714 | 6.308002 | 1.000000 |
| 104 | −1.84824 | 0.36216 | 6.308002 | 1.000000 |
| 105 | −1.8853 | 0.37337 | 6.308002 | 1.000000 |
| 106 | −1.91207 | 0.38714 | 6.308002 | 1.000000 |
| 107 | −1.92968 | 0.39949 | 6.308002 | 1.000000 |
| 108 | −1.94268 | 0.41077 | 6.308002 | 1.000000 |
| 109 | −1.95172 | 0.41997 | 6.308002 | 1.000000 |
| 110 | −1.95739 | 0.42644 | 6.308002 | 1.000000 |
| 111 | −1.96276 | 0.43316 | 6.308002 | 1.000000 |
| 112 | −1.96533 | 0.43661 | 6.308002 | 1.000000 |

| SECTION 10 | Suction Side | | | |
|---|---|---|---|---|
| Pt. | X | Y | Z | %-Span |
| 1 | −1.950582 | 0.491486 | 6.605003 | 1.047083 |
| 2 | −1.953442 | 0.495986 | 6.605003 | 1.047083 |
| 3 | −1.956182 | 0.500556 | 6.605003 | 1.047083 |
| 4 | −1.961302 | 0.509906 | 6.605003 | 1.047083 |
| 5 | −1.965892 | 0.519526 | 6.605003 | 1.047083 |
| 6 | −1.971792 | 0.534396 | 6.605003 | 1.047083 |
| 7 | −1.977762 | 0.554866 | 6.605003 | 1.047083 |
| 8 | −1.982052 | 0.581176 | 6.605003 | 1.047083 |
| 9 | −1.982392 | 0.618486 | 6.605003 | 1.047083 |
| 10 | −1.974332 | 0.665786 | 6.605003 | 1.047083 |
| 11 | −1.954512 | 0.720966 | 6.605003 | 1.047083 |
| 12 | −1.923982 | 0.783186 | 6.605003 | 1.047083 |
| 13 | −1.879002 | 0.849296 | 6.605003 | 1.047083 |
| 14 | −1.818442 | 0.916706 | 6.605003 | 1.047083 |
| 15 | −1.742852 | 0.984136 | 6.605003 | 1.047083 |
| 16 | −1.651842 | 1.049316 | 6.605003 | 1.047083 |
| 17 | −1.545252 | 1.109908 | 6.605003 | 1.047083 |
| 18 | −1.422682 | 1.162228 | 6.605003 | 1.047083 |
| 19 | −1.288902 | 1.198468 | 6.605003 | 1.047083 |
| 20 | −1.140342 | 1.212988 | 6.605003 | 1.047083 |
| 21 | −0.986142 | 1.201948 | 6.605003 | 1.047083 |
| 22 | −0.836772 | 1.162099 | 6.605003 | 1.047083 |
| 23 | −0.691911 | 1.09436 | 6.605003 | 1.047083 |
| 24 | −0.55702 | 1.00843 | 6.605003 | 1.047083 |
| 25 | −0.43279 | 0.90772 | 6.605003 | 1.047083 |
| 26 | −0.31404 | 0.8006 | 6.605003 | 1.047083 |
| 27 | −0.2016 | 0.68688 | 6.605003 | 1.047083 |
| 28 | −0.09652 | 0.566332 | 6.605003 | 1.047083 |
| 29 | 0.00353 | 0.441562 | 6.605003 | 1.047083 |
| 30 | 0.099412 | 0.313561 | 6.605003 | 1.047083 |
| 31 | 0.190822 | 0.18234 | 6.605003 | 1.047083 |
| 32 | 0.278092 | 0.04833 | 6.605003 | 1.047083 |
| 33 | 0.362712 | −0.08738 | 6.605003 | 1.047083 |
| 34 | 0.445812 | −0.22402 | 6.605003 | 1.047083 |
| 35 | 0.526892 | −0.36186 | 6.605003 | 1.047083 |
| 36 | 0.605112 | −0.50136 | 6.605003 | 1.047083 |
| 37 | 0.679882 | −0.63669 | 6.605003 | 1.047083 |
| 38 | 0.752842 | −0.77299 | 6.605003 | 1.047083 |
| 39 | 0.819272 | −0.9062 | 6.605003 | 1.047083 |
| 40 | 0.880022 | −1.03073 | 6.605003 | 1.047083 |
| 41 | 0.938412 | −1.15108 | 6.605003 | 1.047083 |
| 42 | 0.991392 | −1.26178 | 6.605003 | 1.047083 |
| 43 | 1.038422 | −1.36328 | 6.605003 | 1.047083 |
| 44 | 1.080562 | −1.45507 | 6.605003 | 1.047083 |
| 45 | 1.118232 | −1.53724 | 6.605003 | 1.047083 |
| 46 | 1.151582 | −1.61015 | 6.605003 | 1.047083 |
| 47 | 1.180292 | −1.67349 | 6.605003 | 1.047083 |
| 48 | 1.204072 | −1.72726 | 6.605003 | 1.047083 |
| 49 | 1.223242 | −1.77151 | 6.605003 | 1.047083 |
| 50 | 1.235642 | −1.80645 | 6.605003 | 1.047083 |
| 51 | 1.235132 | −1.8331 | 6.605003 | 1.047083 |
| 52 | 1.227722 | −1.85355 | 6.605003 | 1.047083 |
| 53 | 1.217652 | −1.867 | 6.605003 | 1.047083 |
| 54 | 1.209342 | −1.87475 | 6.605003 | 1.047083 |
| 55 | 1.200642 | −1.88148 | 6.605003 | 1.047083 |
| 56 | 1.195942 | −1.88414 | 6.605003 | 1.047083 |

| SECTION 10 | Pressure Side | | | |
|---|---|---|---|---|
| Pt. | X | Y | Z | %-Span |
| 57 | 1.191272 | −1.8862 | 6.605003 | 1.047083 |
| 58 | 1.187252 | −1.88766 | 6.605003 | 1.047083 |
| 59 | 1.183082 | −1.8889 | 6.605003 | 1.047083 |
| 60 | 1.174662 | −1.89064 | 6.605003 | 1.047083 |
| 61 | 1.166162 | −1.89169 | 6.605003 | 1.047083 |
| 62 | 1.153302 | −1.89192 | 6.605003 | 1.047083 |
| 63 | 1.136312 | −1.88959 | 6.605003 | 1.047083 |
| 64 | 1.117252 | −1.87981 | 6.605003 | 1.047083 |
| 65 | 1.096132 | −1.85849 | 6.605003 | 1.047083 |
| 66 | 1.073432 | −1.82731 | 6.605003 | 1.047083 |
| 67 | 1.048362 | −1.78725 | 6.605003 | 1.047083 |
| 68 | 1.019622 | −1.7396 | 6.605003 | 1.047083 |
| 69 | 0.987222 | −1.68416 | 6.605003 | 1.047083 |
| 70 | 0.951202 | −1.62079 | 6.605003 | 1.047083 |
| 71 | 0.910282 | −1.55026 | 6.605003 | 1.047083 |
| 72 | 0.864602 | −1.47282 | 6.605003 | 1.047083 |
| 73 | 0.814012 | −1.38846 | 6.605003 | 1.047083 |
| 74 | 0.757442 | −1.29718 | 6.605003 | 1.047083 |
| 75 | 0.698122 | −1.20281 | 6.605003 | 1.047083 |
| 76 | 0.633282 | −1.1018 | 6.605003 | 1.047083 |
| 77 | 0.564202 | −0.99844 | 6.605003 | 1.047083 |
| 78 | 0.493732 | −0.89605 | 6.605003 | 1.047083 |
| 79 | 0.419572 | −0.791 | 6.605003 | 1.047083 |
| 80 | 0.343931 | −0.68702 | 6.605003 | 1.047083 |
| 81 | 0.26765 | −0.5835 | 6.605003 | 1.047083 |
| 82 | 0.18958 | −0.48133 | 6.605003 | 1.047083 |
| 83 | 0.10938 | −0.38083 | 6.605003 | 1.047083 |
| 84 | 0.02623 | −0.28274 | 6.605003 | 1.047083 |
| 85 | −0.05996 | −0.18732 | 6.605003 | 1.047083 |
| 86 | −0.14852 | −0.09409 | 6.605003 | 1.047083 |
| 87 | −0.24003 | −0.00376 | 6.605003 | 1.047083 |
| 88 | −0.33612 | 0.08169 | 6.605003 | 1.047083 |
| 89 | −0.43575 | 0.16297 | 6.605003 | 1.047083 |
| 90 | −0.53868 | 0.24005 | 6.605003 | 1.047083 |
| 91 | −0.64677 | 0.309688 | 6.605003 | 1.047083 |
| 92 | −0.7601 | 0.370438 | 6.605003 | 1.047083 |
| 93 | −0.87485 | 0.418218 | 6.605003 | 1.047083 |
| 94 | −0.99389 | 0.453988 | 6.605003 | 1.047083 |
| 95 | −1.111792 | 0.476408 | 6.605003 | 1.047083 |
| 96 | −1.222952 | 0.484298 | 6.605003 | 1.047083 |
| 97 | −1.330042 | 0.480626 | 6.605003 | 1.047083 |

TABLE I-continued

| | | | |
|---|---|---|---|
| 98  | −1.427742 | 0.467486 | 6.605003 | 1.047083 |
| 99  | −1.515612 | 0.447986 | 6.605003 | 1.047083 |
| 100 | −1.594822 | 0.429046 | 6.605003 | 1.047083 |
| 101 | −1.666642 | 0.416746 | 6.605003 | 1.047083 |
| 102 | −1.730452 | 0.408866 | 6.605003 | 1.047083 |
| 103 | −1.786112 | 0.406316 | 6.605003 | 1.047083 |
| 104 | −1.832872 | 0.412346 | 6.605003 | 1.047083 |
| 105 | −1.869912 | 0.423126 | 6.605003 | 1.047083 |
| 106 | −1.896312 | 0.437386 | 6.605003 | 1.047083 |
| 107 | −1.913542 | 0.450116 | 6.605003 | 1.047083 |
| 108 | −1.926242 | 0.461646 | 6.605003 | 1.047083 |
| 109 | −1.935032 | 0.471026 | 6.605003 | 1.047083 |
| 110 | −1.940532 | 0.477606 | 6.605003 | 1.047083 |
| 111 | −1.945712 | 0.484426 | 6.605003 | 1.047083 |
| 112 | −1.948192 | 0.487926 | 6.605003 | 1.047083 |

Figure 5:
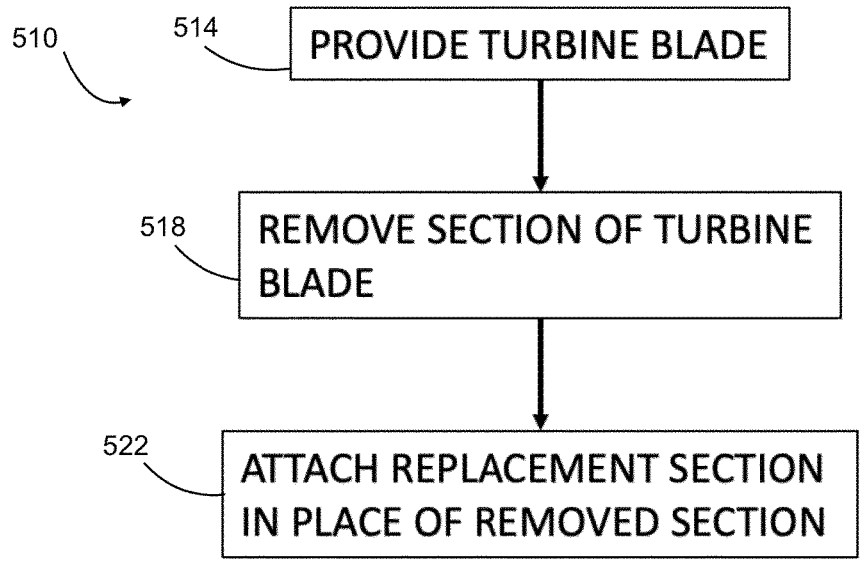
FIG. 5 is a flow chart of a method of modifying a turbine blade in accordance with the teachings of the present disclosure.
Figure 6:
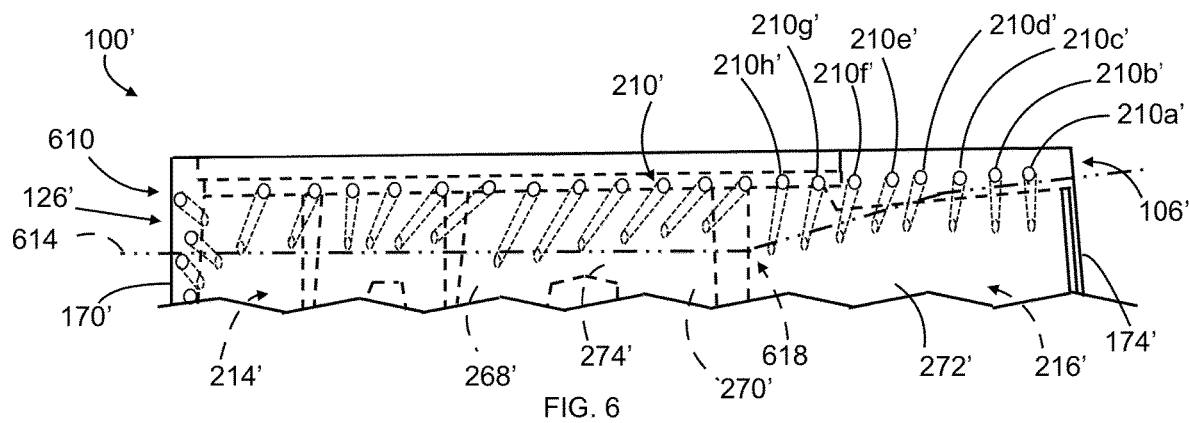
FIG. 6 is a side view of a portion of a turbine blade before being modified by the method of FIG. 5.

Referring to FIG. 5, a method 510 of modifying a turbine blade is illustrated in flow chart format. The modification can be done to a new, unused turbine blade or can be done to a used turbine blade and can optionally be done as a repair of a damaged turbine blade. The method 510 can begin at step 514 by providing a turbine blade in an initial form. An example of a turbine blade in its initial form is illustrated as turbine blade 100' in FIG. 6, though other configurations can be used.

The turbine blade 100' can be similar to the turbine blade 100 (FIGS. 2-4) except as otherwise shown or described herein. As such, features of the turbine blade 100' with reference numerals similar, but primed, to those of the turbine blade 100 (FIG. 4) but primed represent similar features and only differences are described in detail herein.

The method 510 can proceed to step 518 where a section 610 of the turbine blade 100' is removed. In the example provided, the section 610 is removed by cutting the turbine blade 100' along dashed and dotted line 614 shown in FIG. 6, though the turbine blade 100' may be cut along a different line to produce a differently shaped removed section 610. In the example provided, the cut line 614 is not a straight line from the leading edge 170' to the trailing edge 174' and can include bends or curves, though other configurations can be used.

In the example provided, the section 610 extends the entire axial length of the turbine blade 100' from the leading edge 170' to the trailing edge 174'. In an alternative configuration, not specifically shown, the section 610 to be removed can be less than the full axial length of the turbine blade 100'. The section 610 can be removed using any suitable technique, e.g., laser or plasma cutting, or machining.

Figure 7:
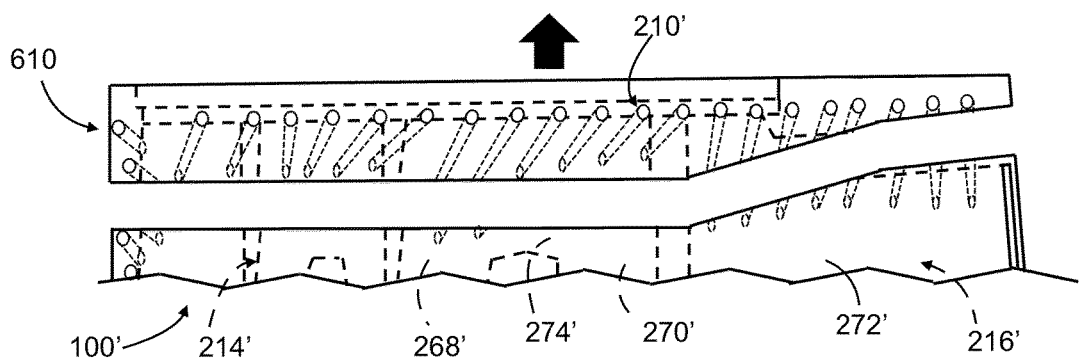
FIG. 7 is a side view of a portion of the turbine blade of FIG. 6 illustrating a section of the turbine blade being removed as set forth in the method of FIG. 5.
Figure 8:
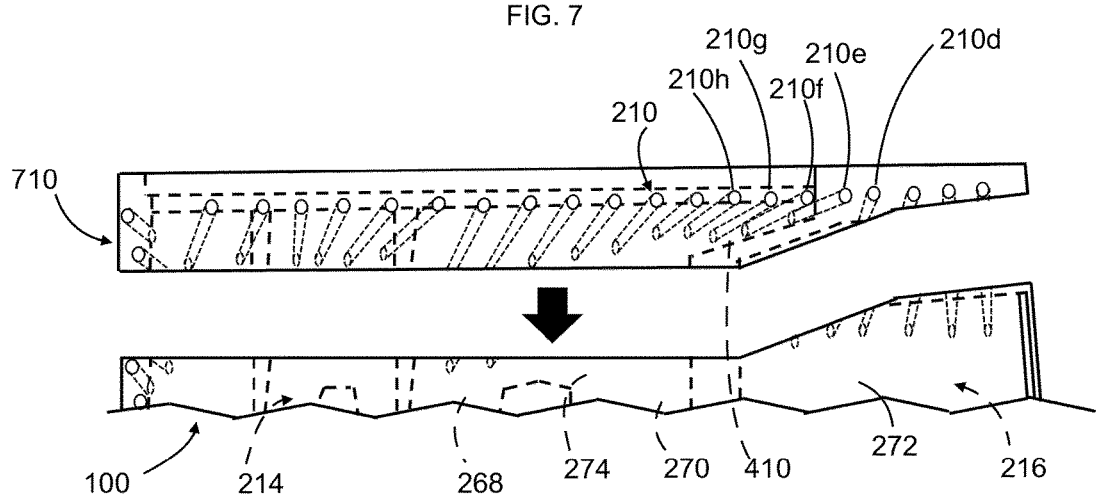
FIG. 8 is a side view of a portion of the turbine blade of FIG. 7 illustrating a replacement section of the turbine blade for replacing the removed section as set forth in the method of FIG. 5.

After the section 610 is cut from the remaining turbine blade 100', the section 610 can be removed from the remainder of the turbine blade 100' as shown in FIG. 7. With additional reference to FIG. 8, after step 514, the method 510 can proceed to step 518 where a turbine blade replacement section 710 is attached to the turbine blade 100' in place of the removed section 610 (FIG. 7). The replacement section 710 can be attached using any suitable technique, e.g., welding, laser welding, additive manufacturing and brazing.

After attaching the replacement section 710, the modified turbine blade can be similar to the turbine blade 100 illustrated in FIGS. 2-4. In the example provided, the modified turbine blade (represented by the turbine blade 100 in FIG. 4) includes a different configuration with respect to the connections of the serpentine cooling pathways 214, 216 to the pressure side cooling apertures 210 than the turbine blade 100' in the initial condition.

In the example provided, the turbine blade 100' in the initial condition does not include the plenum 410 (FIG. 4). In the example provided of the turbine blade 100' in the initial condition, the pressure side cooling apertures 210' that axially overlap with the third leg 272' are all connected to the third leg 272'. In the example provided of the turbine blade 100' in the initial condition, the first eight pressure side cooling apertures 210a'-210h', starting from the trailing edge 174', are all connected to the third leg 272'. As such, the method can replace some of the pressure side cooling apertures 210' that were connected to the third leg 272' with pressure side cooling apertures 210 at similar axial locations but being connected to the plenum 410 at the first junction portion 274 instead of being connected to the third leg 272.

In the example provided, the cut line 614 goes through a forward portion 618 of the third leg 272' and the replacement section 710 is configured to reduce how far radially outward the forward portion 618 of the third leg 272' extends. In the example provided, the plenum 410 in the modified turbine blade 100 is disposed where part of the forward portion 618 of the third leg 272' was in the initial condition. In other words, a portion of the third leg 272' can extend radially outward further in the initial condition than in the modified turbine blade 100.

Accordingly, the turbine blade and method of modifying a turbine blade described and claimed herein can provide improved cooling to the pressure side blade tip in comparison to traditional turbine blades.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A turbine blade comprising:
 a root defining a plurality of supply channels configured to receive a supply of pressurized gas;
 a blade tip defining a plurality of tip cooling apertures open through a pressure side surface of the blade tip; and
 an airfoil extending in a radially outward direction from the root to the blade tip, the airfoil having a pressure side surface and a suction side surface connected to the pressure side surface of the airfoil by a leading edge of the airfoil and a trailing edge of the airfoil,
 wherein the turbine blade defines a first serpentine interior cooling passage having a first leg, a second leg, a third leg, a first junction portion, and a second junction portion, the first leg configured to receive pressurized gas from at least one supply channel of the plurality of supply channels, the first leg extending radially within the airfoil and connected to the second leg by the first junction portion proximate the blade tip, the second leg extending radially between the first junction portion and the second junction portion, the second junction portion connecting the second leg to the third leg, the third leg extending radially from the second junction portion toward the blade tip, wherein the plurality of tip cooling apertures includes a forward tip cooling aperture that has a forward end that opens into the first junction portion and an aftward end that opens through the pressure side surface of the blade tip at a location that is radially outward of the third leg and axially aftward of at least a portion of the third leg, wherein the first junction portion includes a plenum that overlaps the third leg in an axial direction of the turbine blade, the plenum having a width that narrows in the axial direction aftward of the portion of the third leg, wherein the airfoil comprises a nominal airfoil profile in accordance with Cartesian coordinate values of X, Y, and Z as set forth in Table I, wherein the values of X and Y are distances in inches which, when connected by smooth continuing arcs, define airfoil profile sections at each value of Z which is a distance expressed as a percentage of a span of the nominal airfoil profile, the airfoil profile sections at the Z distances being joined smoothly with one another to form a complete airfoil shape.

2. The turbine blade according to claim 1, wherein the forward end of the forward tip cooling aperture opens into the plenum.

3. The turbine blade according to claim 2, wherein the aftward end of the forward tip cooling aperture exits the blade tip at a location that is aftward of the plenum.

4. The turbine blade according to claim 1, wherein the plurality of tip cooling apertures includes an aftmost tip cooling aperture that opens into the third leg.

5. The turbine blade according to claim 1, wherein the plurality of tip cooling apertures includes more than eight tip cooling apertures arranged in a row with each tip cooling aperture spaced apart along an axial direction of the turbine blade, wherein, relative to the trailing edge, a first eight tip cooling apertures of the row includes the forward tip cooling aperture.

6. The turbine blade according to claim 5, wherein, including the forward tip cooling aperture, four of the first eight tip cooling apertures are connected to the first junction portion and four of the first eight tip cooling apertures are connected to the third leg.

7. The turbine blade according to claim 1, wherein the turbine blade further defines a second serpentine interior cooling passage configured to receive pressurized gas from at least one supply channel of the plurality of supply channels, the second serpentine interior cooling passage being disposed between the leading edge and the first serpentine interior cooling passage.

8. The turbine blade according to claim 1, wherein the trailing edge of the airfoil defines a trailing edge cooling aperture open through the trailing edge and open into the third leg.

9. A turbine blade comprising:
a root defining a plurality of supply channels configured to receive a supply of pressurized gas;
a blade tip defining a plurality of tip cooling apertures open through a pressure side surface of the blade tip; and
an airfoil extending in a radially outward direction from the root to the blade tip, the airfoil having a pressure side surface and a suction side surface connected to the pressure side surface of the airfoil by a leading edge of the airfoil and a trailing edge of the airfoil, wherein the turbine blade defines a first serpentine interior cooling passage having a first leg, a second leg, a third leg, a first junction portion, and a second junction portion, the first leg configured to receive pressurized gas from at least one supply channel of the plurality of supply channels, the first leg extending radially within the airfoil and connected to the second leg by the first junction portion proximate the blade tip, the second leg extending radially between the first junction portion and the second junction portion, the second junction portion connecting the second leg to the third leg, the third leg extending radially from the second junction portion toward the blade tip, wherein the first junction portion includes a plenum that extends axially aftward of a portion of the third leg, the plenum having a width that narrows in an axial direction aftward of the portion of the third leg, wherein the plurality of tip cooling apertures includes a forward tip cooling aperture that has a forward end open to the plenum and an aftward end that opens through the pressure side surface of the blade tip at a location that is radially outward of the third leg and axially aftward of the portion of the third leg, wherein the airfoil comprises a nominal airfoil profile in accordance with Cartesian coordinate values of X, Y, and Z as set forth in Table I, wherein the values of X and Y are distances in inches which, when connected by smooth continuing arcs, define airfoil profile sections at each value of Z which is a distance expressed as a percentage of a span of the nominal airfoil profile, the airfoil profile sections at the Z distances being joined smoothly with one another to form a complete airfoil shape.

10. The turbine blade according to claim 9, wherein the plurality of tip cooling apertures includes more than eight tip cooling apertures arranged in a row with each tip cooling aperture spaced apart along the axial direction of the turbine blade, wherein, relative to the trailing edge, a first eight tip cooling apertures of the row includes the forward tip cooling aperture.

11. The turbine blade according to claim 10, wherein, including the forward tip cooling aperture, four of the first eight tip cooling apertures are connected to the first junction portion and four of the first eight tip cooling apertures are connected to the third leg.

12. The turbine blade according to claim 9, wherein the plenum does not extend in the axial direction of the turbine blade forward of the first leg.

13. The turbine blade according to claim 9, wherein the plurality of tip cooling apertures includes an aftmost tip cooling aperture that opens into the third leg.

14. The turbine blade according to claim 9, wherein the location is aftward of the plenum.

15. The turbine blade according to claim 9, wherein the turbine blade further defines a second serpentine interior cooling passage configured to receive pressurized gas from at least one supply channel of the plurality of supply channels, the second serpentine interior cooling passage being disposed between the leading edge and the first serpentine interior cooling passage.

16. A turbine blade comprising:
a root defining a plurality of supply channels configured to receive a supply of pressurized gas;

a blade tip defining a plurality of tip cooling apertures open through a pressure side surface of the blade tip; and an airfoil extending in a radially outward direction from the root to the blade tip, the airfoil having a pressure side surface and a suction side surface connected to the pressure side surface of the airfoil by a leading edge of the airfoil and a trailing edge of the airfoil, the trailing edge of the airfoil defining a trailing edge cooling aperture, wherein the turbine blade defines a first serpentine interior cooling passage having a first leg, a second leg, a third leg, a first junction portion, and a second junction portion, the first leg configured to receive pressurized gas from at least one supply channel of the plurality of supply channels, the first leg extending radially within the airfoil and connected to the second leg by the first junction portion proximate the blade tip, the second leg extending radially between the first junction portion and the second junction portion, the second junction portion connecting the second leg to the third leg, the third leg extending radially from the second junction portion toward the blade tip and connected to the trailing edge cooling aperture to exhaust the pressurized gas to an exterior of the turbine blade, wherein the turbine blade defines a second serpentine interior cooling passage configured to receive pressurized gas from at least one supply channel of the plurality of supply channels, the second serpentine interior cooling passage being disposed between the leading edge and the first serpentine interior cooling passage, wherein the first junction portion includes a plenum that extends axially aftward of a portion of the third leg, the plenum having a width that narrows in the axial direction aftward of the portion of the third leg, wherein the plurality of tip cooling apertures includes a forward tip cooling aperture that has a forward end open to the plenum and an aftward end that opens through the pressure side surface of the blade tip at a location that is radially outward of the third leg and axially aftward of the portion of the third leg, wherein the plurality of tip cooling apertures includes more than eight tip cooling apertures arranged in a row with each tip cooling aperture spaced apart along the axial direction of the turbine blade, wherein, relative to the trailing edge, a first eight tip cooling apertures of the row includes the forward tip cooling aperture, wherein, including the forward tip cooling aperture, four of the first eight tip cooling apertures are connected to the first junction portion and four of the first eight tip cooling apertures are connected to the third leg, wherein the airfoil comprises a nominal airfoil profile in accordance with Cartesian coordinate values of X, Y, and Z as set forth in Table I, wherein the values of X and Y are distances in inches which, when connected by smooth continuing arcs, define airfoil profile sections at each value of Z which is a distance expressed as a percentage of a span of the nominal airfoil profile, the airfoil profile sections at the Z distances being joined smoothly with one another to form a complete airfoil shape.

17. The turbine blade according to claim 16, wherein the plenum does not extend in an axial direction of the turbine blade forward of the first leg.

18. The turbine blade according to claim 16, wherein the location is aftward of the plenum.

* * * * *